US008253977B2

(12) United States Patent
Mori

(10) Patent No.: US 8,253,977 B2
(45) Date of Patent: Aug. 28, 2012

(54) CONTROLLING SHARE OF PROCESSING BY EACH PROCESSOR BASED ON TENDENCY OF COMPOSITING PIXEL INFORMATION IN AN IMAGE AREA

(75) Inventor: Hiroshi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 12/463,595

(22) Filed: May 11, 2009

(65) Prior Publication Data
US 2009/0284773 A1 Nov. 19, 2009

(30) Foreign Application Priority Data
May 15, 2008 (JP) ................................ 2008-128793

(51) Int. Cl.
H04N 1/387 (2006.01)
G06K 15/00 (2006.01)
G06F 9/46 (2006.01)
(52) U.S. Cl. ........ 358/1.9; 358/1.18; 358/540; 358/450; 382/302; 382/304; 718/100
(58) Field of Classification Search .................. 358/1.9, 358/2.1, 1.18, 518, 530, 540, 448, 450, 462; 382/180, 254, 276, 284, 302–304; 718/100, 718/102, 104, 105, 107; 708/230, 231, 233, 708/234; 345/418, 502, 505, 506
See application file for complete search history.

(56) References Cited

U.S. PATENT DOCUMENTS
6,665,435 B1 * 12/2003 Caldato et al. ................ 382/302
7,254,283 B1 * 8/2007 Nishigaki et al. ............. 382/304
7,460,285 B2 * 12/2008 Yamazaki et al. ............. 358/1.9
7,466,465 B2 * 12/2008 Yamazaki et al. ............. 358/1.9
7,961,194 B2 * 6/2011 Bakalash et al. .............. 382/304
8,089,641 B2 * 1/2012 Idehara ......................... 382/302
2006/0164419 A1 7/2006 Nishi FOREIGN PATENT DOCUMENTS
| JP | 2004-104735 A | 4/2004 |
|---|---|---|
| JP | 2004-326307 | 11/2004 |
| JP | 2005-217618 A | 8/2005 |
| JP | 2006-202211 A | 8/2006 |
| JP | 2006-209514 A | 8/2006 |
| JP | 2007-081699 A | 3/2007 |

OTHER PUBLICATIONS
Japanese Office Action dated Mar. 9, 2012 in Japanese counterpart application 2008-128793, with English translation.

* cited by examiner

Primary Examiner — Scott A Rogers
(74) Attorney, Agent, or Firm — Fitzpatrick, Cella, Harper & Scinto

(57) ABSTRACT

An image processing apparatus for sharing image processing for an image area by a plurality of processors, analyzes a tendency of compositing input pixel information in the image area, determines a share of tasks to be executed by each of the plurality of processors based on the analysis result, and controls the share of tasks by each of the plurality of processors in accordance with the determined share of tasks. For example, when the plurality of processors include a first processor which executes a generation process of pieces of pixel information for respective layers to be composited, and a second processor which composites the pieces of generated pixel information, the requirement or complexity of a compositing processing, or the size of area in which the compositing processing is performed is analyzed, so as to control the share of tasks or a communication method of the first and second processors.

23 Claims, 22 Drawing Sheets

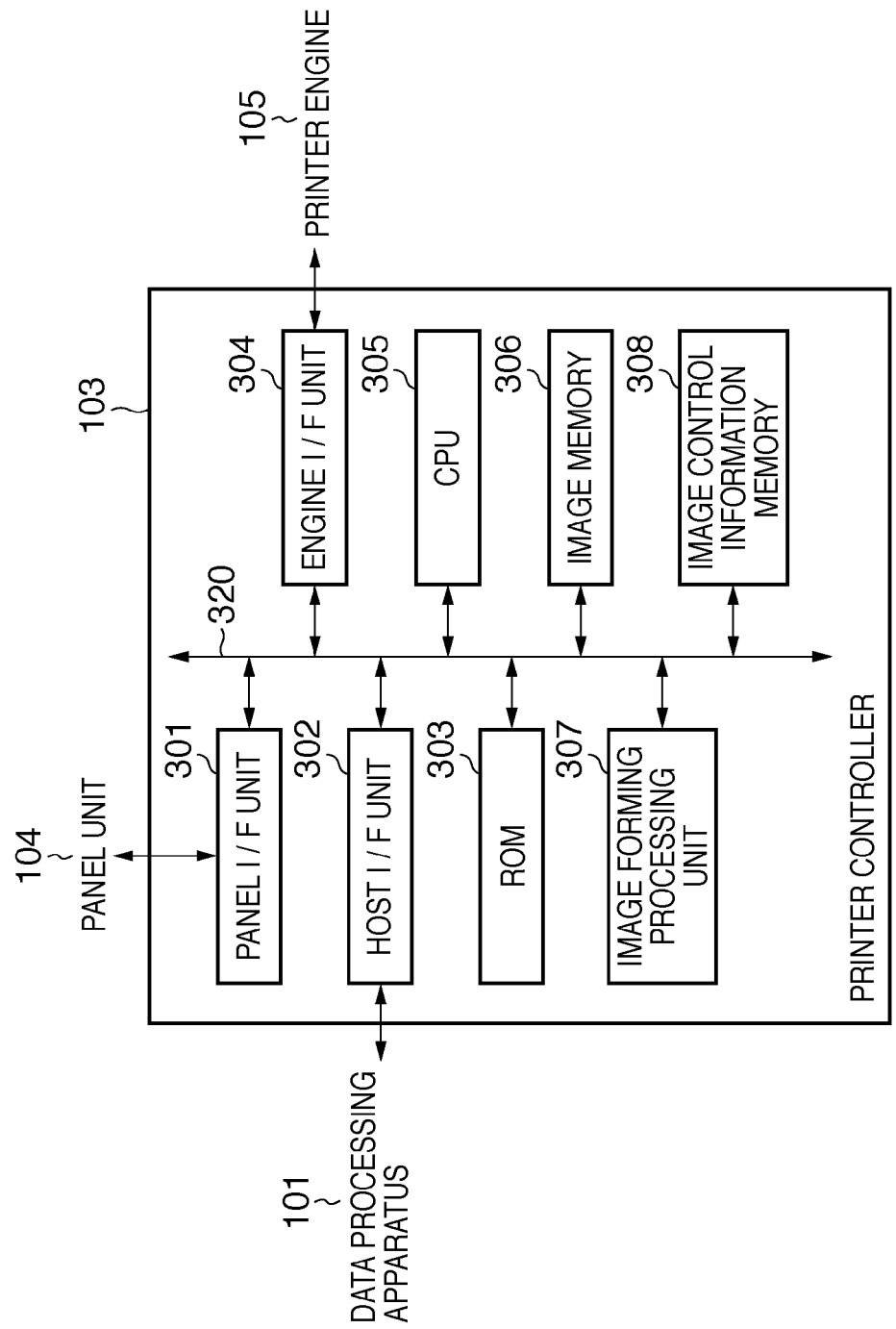

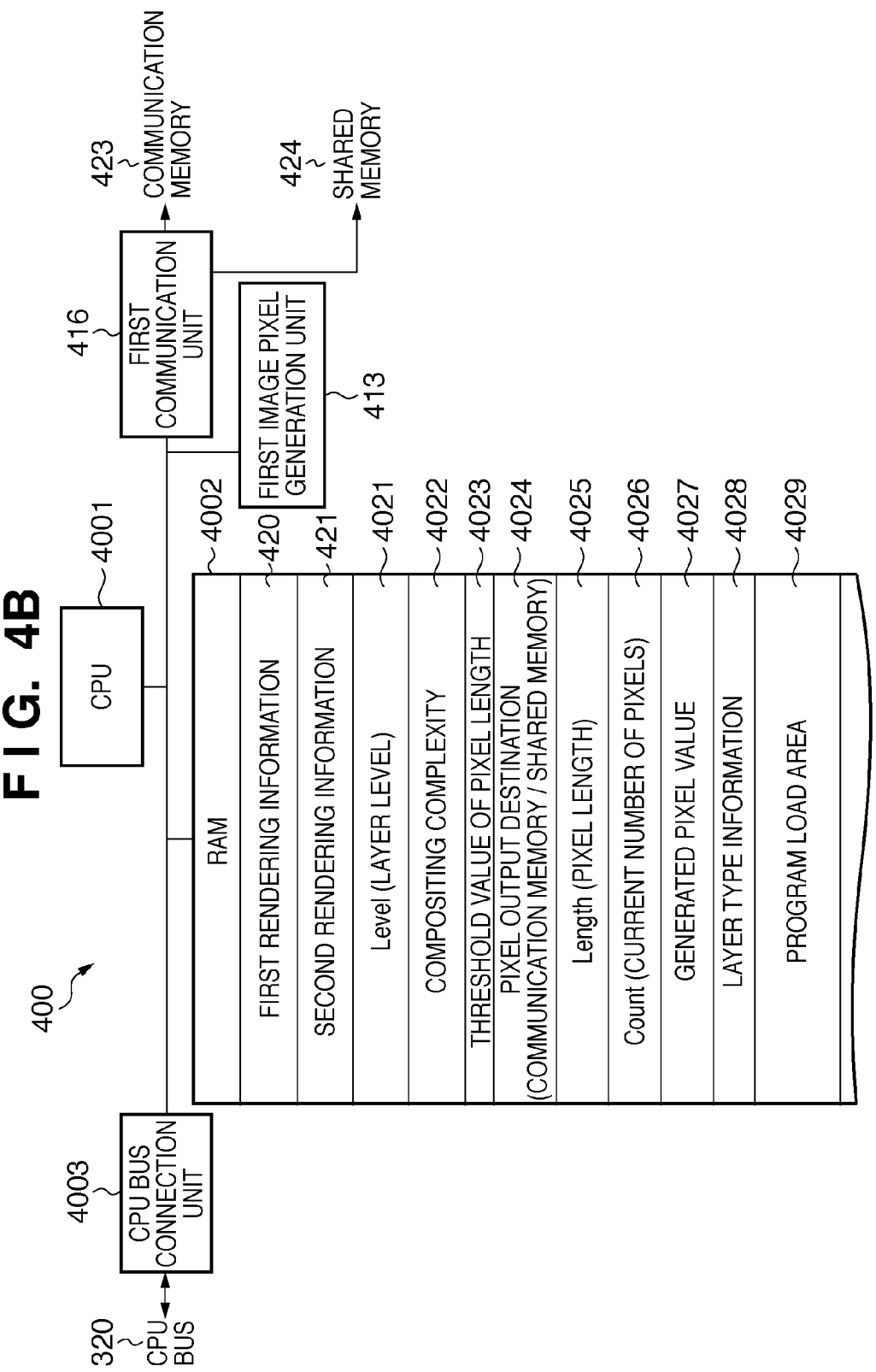

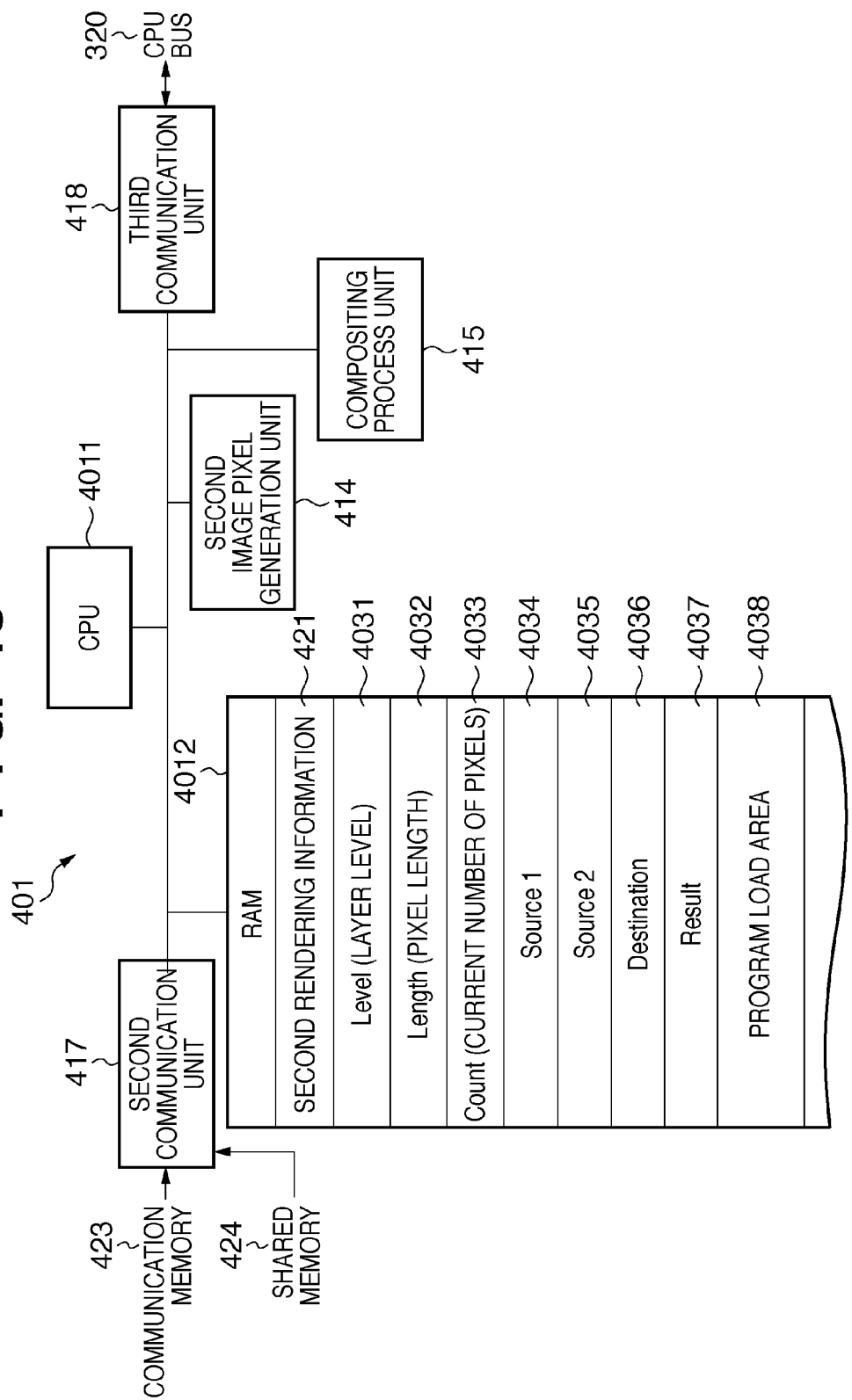

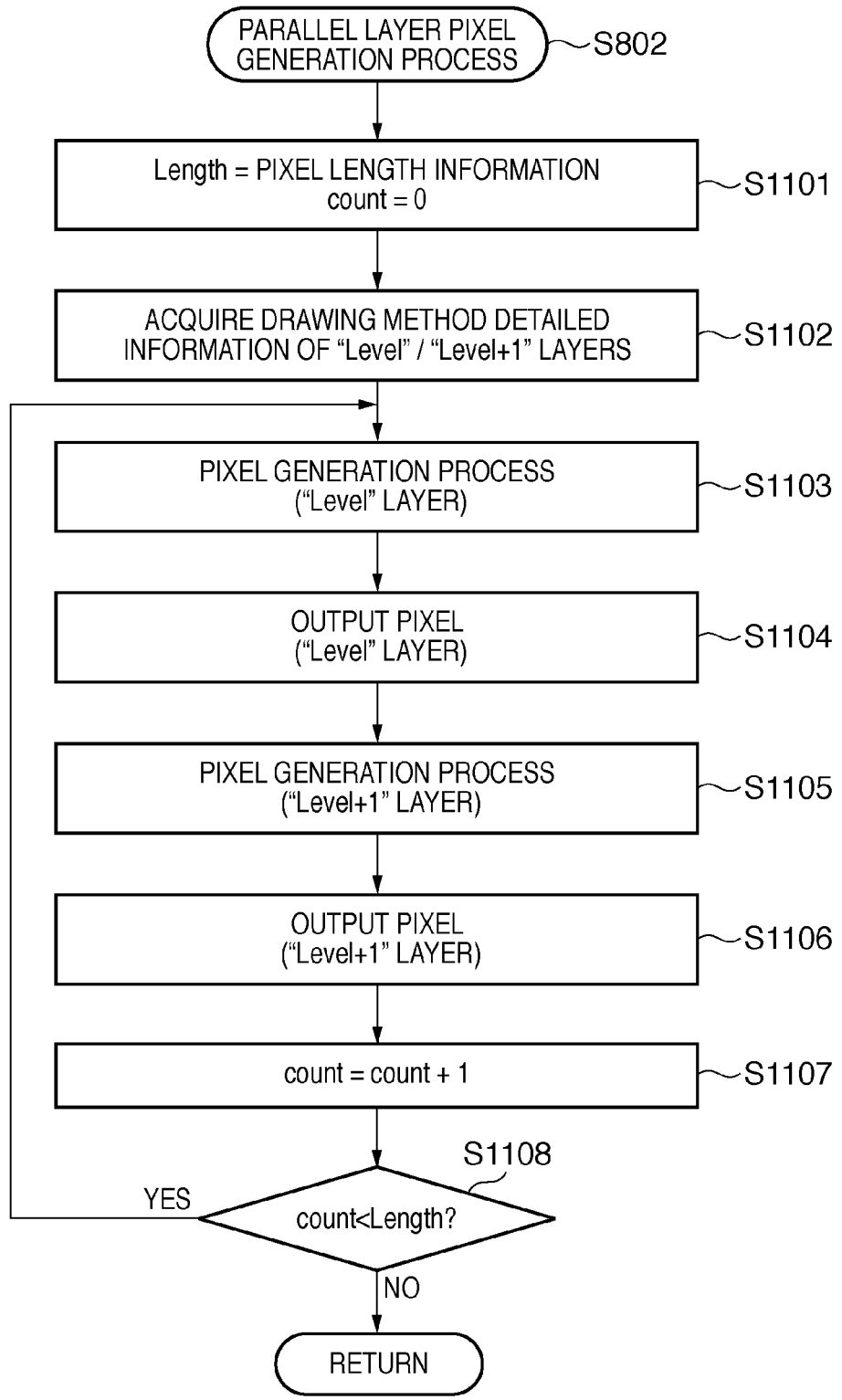

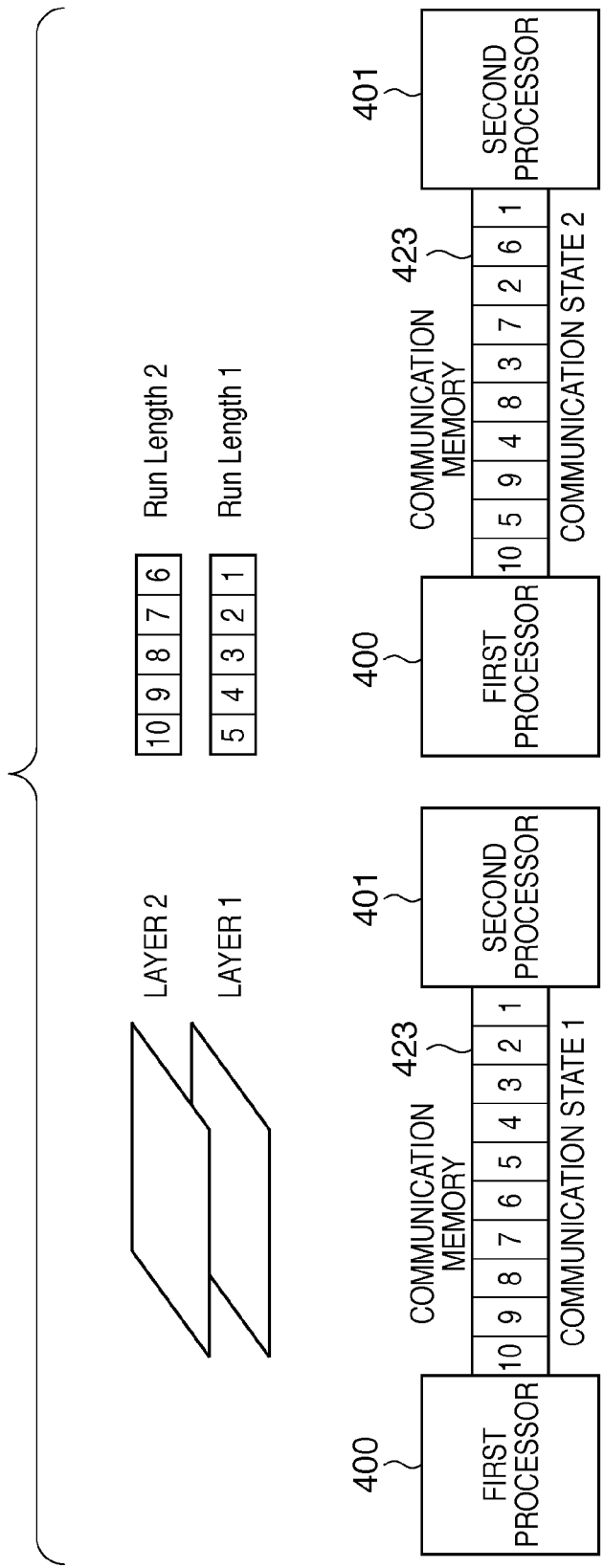

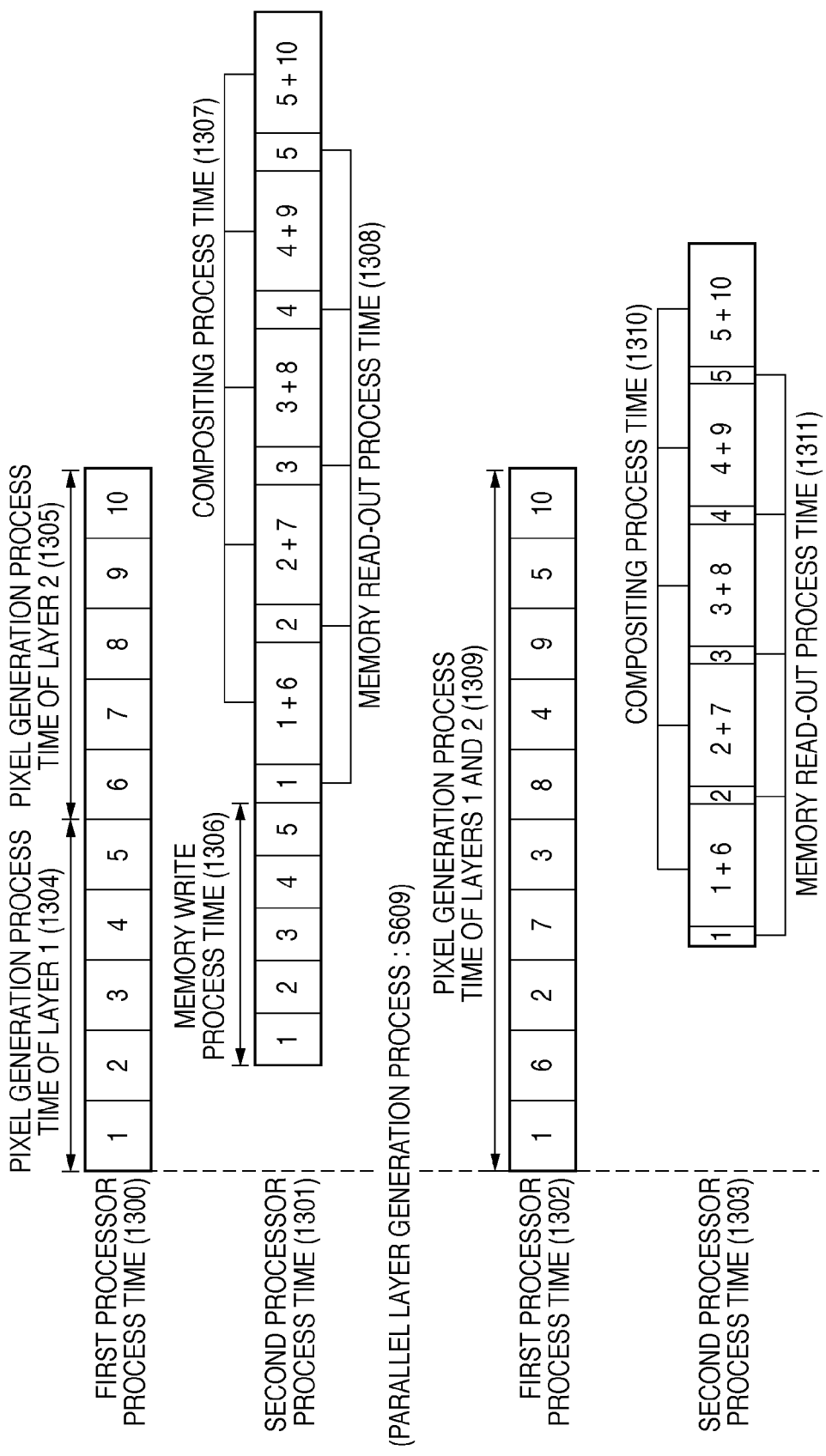

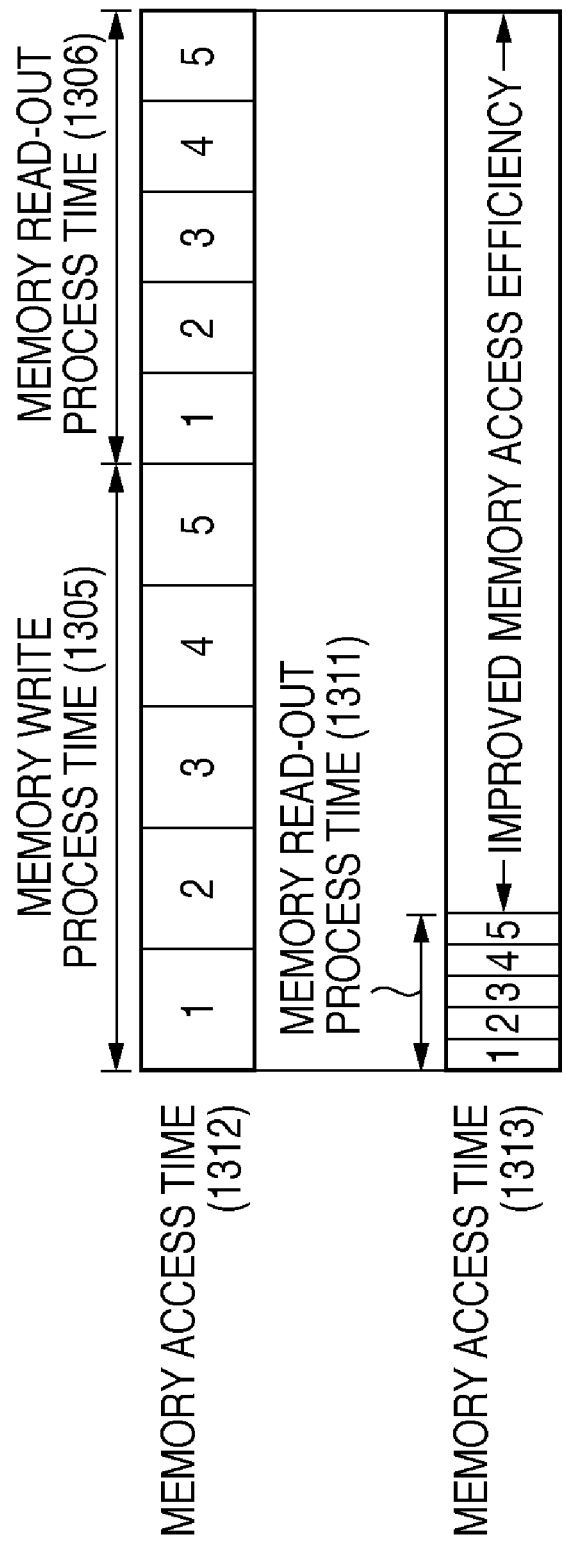

CONTROLLING SHARE OF PROCESSING BY EACH PROCESSOR BASED ON TENDENCY OF COMPOSITING PIXEL INFORMATION IN AN IMAGE AREA

BACKGROUND OF THE INVENTION

1. Field of the Invention

The present invention relates to an image processing method, image processing apparatus, and control method thereof and, more particularly, to an image processing method and image processing apparatus, which achieve an optimal distribution of processing depending on a data tendency in an arrangement including a plurality of processors, and a control method thereof.

2. Description of the Related Art

In recent years, as printers gain higher image quality, images having complex composite processing and transparently processing have prevailed. Especially, PDF propounded by Adobe Systems, XPS propounded by Microsoft, and the like implement complex transparently processing of objects, and require complex calculation processing and the like. On the other hand, conventional simple data that do not use any complex calculations described above still have deep-rooted popularity, and data of various tendencies are used.

In recent years, in order to speed up image forming processing, a parallel use technology of various resources has been proposed. In particular, a technology that realizes the parallel use and speeding up of processing by holding a plurality of processors has been proposed.

Japanese Patent Laid-Open No. 2004-326307 has proposed a technology that dynamically switch the process shares of RIP (Rendering Image Processing) processing, UCR (Under Color Removal) processing, and compression processing according to the processing states of the plurality of processors.

However, the aforementioned related art cannot achieve the flexible process sharing of the RIP processing, and cannot achieve balancing of the processor loads depending on the data tendencies. Especially, in recent years, since data of various tendencies such as data that require complex transparently processing, and simple data have prevailed, it is demanded to achieve the process share of the RIP processing itself optimal to the data tendency.

SUMMARY OF THE INVENTION

In order to solve the aforementioned problems, the present invention provides an image processing method and image processing apparatus which can implement high-speed image processing independently of the tendencies of input image data by obtaining an appropriate load balancing to a plurality of processors, and a control method thereof.

An image processing apparatus according to the present invention comprises the following arrangement. An image processing apparatus for sharing image processing for an image area by a plurality of processors, comprises: an analysis unit adapted to analyze a tendency of compositing input pixel information in the image area; a determination unit adapted to determine a share of tasks to be processed by each of the plurality of processors based on an analysis result of the analysis unit; and a control unit adapted to control the share of tasks by each of the plurality of processors in accordance with the share of tasks determined by the determination unit. A method of controlling an image processing apparatus for sharing an image processing for an image area by a plurality of processors, comprises the steps of: analyzing a tendency of compositing input pixel information in the image area; determining a share of tasks to be processed by each of the plurality of processors based on an analysis result in the analysis step; and controlling the share of tasks by each of the plurality of processors in accordance with the share of tasks determined in the determination step.

An image processing method for sharing image processing for an image area by a plurality of processors, comprises the steps of: analyzing a tendency of compositing input pixel information in the image area; and controlling a share of tasks by each of the plurality of processors based on an analysis result in the analysis step.

An image processing apparatus for executing image processing using a first processor and a second processor, which are connected via an interface having a queue, comprises: a control unit adapted to control to output an image from the first processor to the second processor in a pixel order when an image compositing processing is not required, and to alternately output images from the first processor to the second processor when the image compositing processing is required.

As described above, according to the present invention, the appropriate load sharing by the plurality of processors can be achieved in correspondence with the tendency of input image data. Especially, data including complex compositing processing and transparently processing and data without such processes are analyzed to achieve the process sharing suited to each data, thus implementing high-speed processing independently of the tendencies of input image data.

Even for an overhead caused by the process sharing, by appropriately selecting a communication method of the plurality of processors and resources to be switched, the processing load can be reduced, thus speeding up the processing.

Further features of the present invention will become apparent from the following description of exemplary embodiments with reference to the attached drawings.

BRIEF DESCRIPTION OF THE DRAWINGS

FIG. 3 is a block diagram showing an example of the arrangement of a printer controller shown in FIG. 1;

FIG. 4B is a block diagram showing an example of the arrangement of a first processor shown in FIG. 4;

FIG. 4C is a block diagram showing an example of the arrangement of a second processor shown in FIG. 4;

FIG. 11 is a flowchart showing an example of the processing sequence of a parallel layer pixel generation process S802 in FIG. 8A;

FIG. 12 is a view for explaining the merit of a communication method between the first and second processors in the image forming processing unit of this embodiment;

FIG. 13A is a timing chart for explaining the merit of the process time in the second processor in the image forming processing unit of this embodiment;

FIG. 13B is a timing chart for explaining the merit of the process time in the second processor in the image forming processing unit of this embodiment;

DESCRIPTION OF THE EMBODIMENTS

The preferred embodiments of the present invention will be described in detail hereinafter with reference to the accompanying drawings. Note that embodiments to be described hereinafter will explain an example in which the present invention is applied to a printer control system. However, the technical scope of the present invention is not limited to a printer control system, and is applicable to speeding up of parallel processing of a plurality of processors in other systems. For example, software applied to the present invention is not limited to the printer control system but it is widely applicable to word-processor software, spreadsheet software, drawing software, and the like. They are also included in the present invention.

<Arrangement Example of Printer Control System of this Embodiment>

Figure 1:
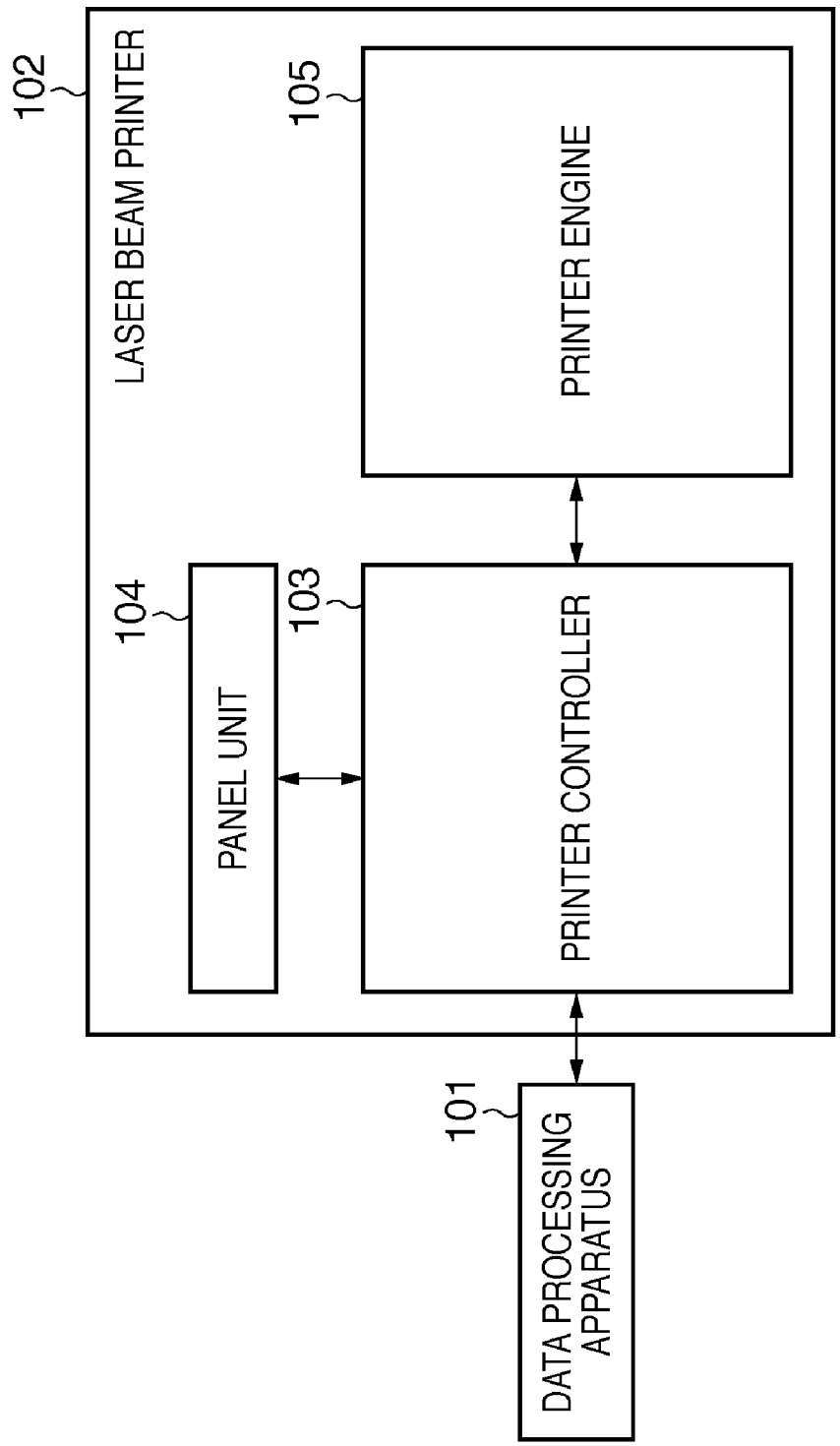
FIG. 1 is a schematic diagram showing an example of the arrangement of a printer control system according to an embodiment of the present invention.

FIG. 1 is a schematic diagram showing an example of the arrangement of a printer control system according to this embodiment. As a printer as an image processing apparatus to which this embodiment is applied, a laser beam printer will be exemplified. However, the printer to which the present invention is applied is not limited to the laser beam printer, and printers of other print systems such as an ink-jet printer may be used.

Referring to FIG. 1, a data processing apparatus 101 is a computer such as a personal computer, and serves as a source of a control code for an image processing apparatus or a control apparatus of the printer.

A laser beam printer 102 is an image processing apparatus of this embodiment, and includes a printer controller 103, printer engine 105, and panel unit 104.

The printer controller 103 generates raster data for respective pages based on image information included in a control code (for example, an ESC code, page description language, or band description language) for an image processing apparatus supplied from the data processing apparatus 101, and outputs the generated raster data to the printer engine 105.

The printer engine 105 prints an image by forming a latent image on a photosensitive drum based on the raster data supplied from the printer controller 103, and transferring and fixing the latent image on a print medium (electrophotography system).

The panel unit 104 is used as a user interface. The user can input desired operation instructions by operating the panel unit 104. The panel unit 104 displays the processing contents of the laser beam printer 102, and the warning contents to the user.

<Arrangement Example of Laser Beam Printer>
(Arrangement Example of Printer Engine)

Figure 2:
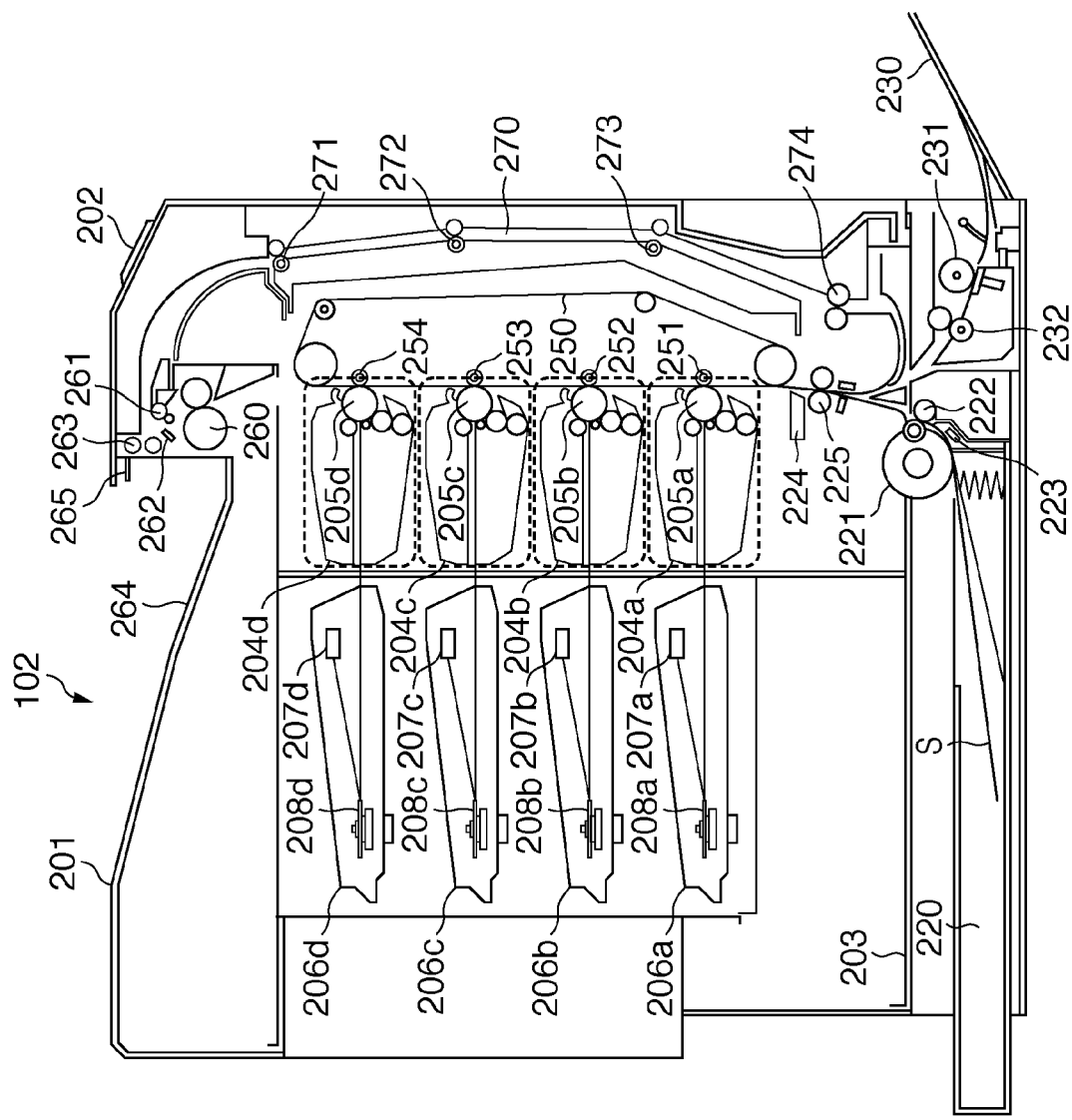
FIG. 2 is a sectional view showing an example of the arrangement of a laser beam printer as an image processing apparatus shown in FIG. 1.

FIG. 2 is a sectional view for explaining an example of the arrangement of the printer engine 105 of the tandem-type color laser beam printer 102.

Referring to FIG. 2, reference numeral 201 denotes a printer housing. Reference numeral 202 denotes an operation panel on which switches used by the user to input various instructions, LED indicators and an LCD display used to display, e.g., messages and setting contents of the printer, and the like are arranged, and which is one mode of the panel unit 104 shown in FIG. 1. Reference numeral 203 denotes a board housing that houses a board that configures electronic circuits of the video controller 103 and printer engine 105.

Reference numeral 220 denotes a paper cassette which holds paper sheets (print media) S, and has a mechanism for electrically detecting a paper size by a partition plate (not shown). Reference numeral 221 denotes a cassette clutch having a cam which picks up an uppermost one of paper sheets S set in the paper cassette 220, and conveys the picked-up paper sheet S to a feed roller 222 by a driving force transmitted from a driving unit (not shown). This cam is intermittently rotated every time a paper sheet is fed, and feeds one paper sheet S per rotation. Reference numeral 223 denotes a paper sensor which detects the quantity of paper sheets S held by the paper cassette 220. The feed roller 222 conveys the leading end portion of the paper sheet S to a registration shutter 224. The registration shutter 224 can stop feeding by pressing the paper sheet S.

Reference numeral 230 denotes a manual insertion tray; and 231, a manual insertion feed clutch. The manual insertion feed clutch 231 is used to convey the leading end of the paper sheet S to manual insertion feed rollers 232. The manual insertion feed rollers 232 are used to convey the leading end of the paper sheet S to the registration shutter 224. A paper sheet S used in image printing is fed by selecting one paper feed unit of the paper cassette 220 and the manual insertion tray 230.

The printer engine 105 in FIG. 1 communicates with the video controller 103 in accordance with a predetermined communication protocol, and selects one paper feed unit from the paper cassette 220 and the manual insertion tray 230 in accordance with an instruction from the video controller 103. Furthermore, the printer engine 105 conveys a paper sheet S from the corresponding paper feed unit to the registration shutter 224 in response to a print start instruction. Note that the printer engine 105 includes the paper feed unit, a mechanism associated with an electrophotography process including formation, transfer, and fixing of a latent image, an exhaust unit, and a control unit for these units.

Reference numerals 204a, 204b, 204c, and 204d denote image printing units which include photosensitive drums 205a, 205b, 205c, and 205d, and toner holding units, and form a toner image on a paper sheet S by the electrophotography process. On the other hand, reference numerals 206a, 206b, 206c, and 206d denote laser scanner units, which supply image formation to the image printing units by means of laser beams. In the image printing units 204a, 204b, 204c, and 204d, a paper convey belt 250 for conveying a paper sheet S is flatly strained in the paper convey direction (a bottom-up direction in FIG. 2) by a plurality of rollers 251 to 254. On its upmost stream portion, a paper sheet is electrostatically attached on the paper convey belt 250 by attraction rollers 225 applied with a bias. The four photosensitive drums 205a, 205b, 205c, and 205d are linearly arranged to face this belt convey surface, thus forming image forming units. Each of the image printing units 204a, 204b, 204c, and 204d includes a charger and developer which surround the neighborhood of the periphery of the corresponding photosensitive drum.

The laser scanner units 206a, 206b, 206c, and 206d will be described below. Reference numerals 207a, 207b, 207c, and 207d denote laser units, which drive internal semiconductor lasers in accordance with an image signal (/VIDEO signal) output from the printer controller 103 to emit laser beams. The laser beams emitted by the laser units 207a, 207b, 207c, and 207d are scanned by polygonal mirrors 208a, 208b, 208c, and 208d, and form latent images on the photosensitive drums 205a, 205b, 205c, and 205d.

Reference numeral 260 denotes a fixing device which thermally fixes toner images, which are formed on the paper sheet S by the image printing units 204a, 204b, 204c, and 204d, onto the paper sheet S. Reference numeral 261 denote a convey roller, which conveys the paper sheet S in an exhaust direction. Reference numeral 262 denotes an exhaust sensor which detects an exhaust state of the paper sheet S. Reference numeral 263 denotes exhaust rollers, which also serve as rollers used to switch a double-sided print convey path. The rollers 263 convey the paper sheet S in the exhaust direction, and exhaust the paper sheet S directly onto an exhaust tray 264 when a convey instruction of the paper sheet S is "exhaust". When a convey instruction is "double-sided convey", the rotation direction of the rollers 263 is reversed immediately after the trailing end of the paper sheet S has passed the exhaust sensor 262, and the rollers 263 convey the paper sheet S onto a double-sided print convey path 270 by switching it back. Reference numeral 265 denotes an exhausted load sensor, which detects the load of paper sheets S stacked on the exhaust tray 264.

Reference numeral 270 denotes a double-sided print convey path. A paper sheet S, which is conveyed onto the double-sided print convey path 270 by the exhaust rollers 263 which also serve as the double-sided print convey path switching rollers, is conveyed to the registration shutter 224 again by double-sided convey rollers 271 to 274. Then, the paper sheet S waits for a convey instruction to the image printing units 204a, 204b, 204c, and 204d.

Note that the laser beam printer 102 can be further equipped with optional cassettes and optional units such as an envelope feeder.

(Arrangement Example of Printer Controller)

FIG. 3 is a block diagram for explaining an example of the arrangement of the printer controller 103 of this embodiment.

Referring to FIG. 3, reference numeral 301 denotes a panel interface unit which makes a data communication with the panel unit 104. Reference numeral 302 denotes a host interface unit which establishes connection for two-way communications with the data processing apparatus 101 such as a host computer via a network. A ROM 303 stores a program to be executed by a CPU 305. Reference numeral 304 denotes an engine interface unit which establishes connection for a communication with the printer engine 105.

The CPU 305 can confirm the contents set and instructed by the user on the panel unit 104 via the panel interface unit 301. Also, the CPU 305 can detect the state of the printer engine 105 via the engine interface unit 304. The CPU 305 controls devices connected to a CPU bus 320 based on a control program code held in the ROM 303. An image memory 306 is a memory including a RAM or a disk used to temporarily hold raster data generated by an image forming processing unit 307.

The image forming processing unit 307 executes processing for receiving data for image forming processing from the CPU 305, executing image forming processing of the present invention, and storing an image in the image memory 307. As a preferred arrangement example of this embodiment, the image forming processing unit 307 has hardware that implements a pixel generation process (S1003 in FIG. 10, and S1103 and S1105 in FIG. 11), and a compositing processing (S1504 in FIG. 15, and S1604 and S1606 in FIG. 16) (to be described later). Also, the image forming processing unit 307 adopts an arrangement in which other processing units (to be described later) are held as programs in the ROM 303, and their processes are implemented by loading the programs onto a memory at the time of execution.

An image control information memory 308 is a memory including a RAM or disk used to store image control commands received from the data processing apparatus 101, data to the image forming processing unit 307, or status information to be transmitted to the data processing apparatus 101.

Reference numeral 320 denotes a CPU bus including address, data, and control buses.

<Arrangement Example of Image Forming Processing Unit of this Embodiment>

Figure 4A:
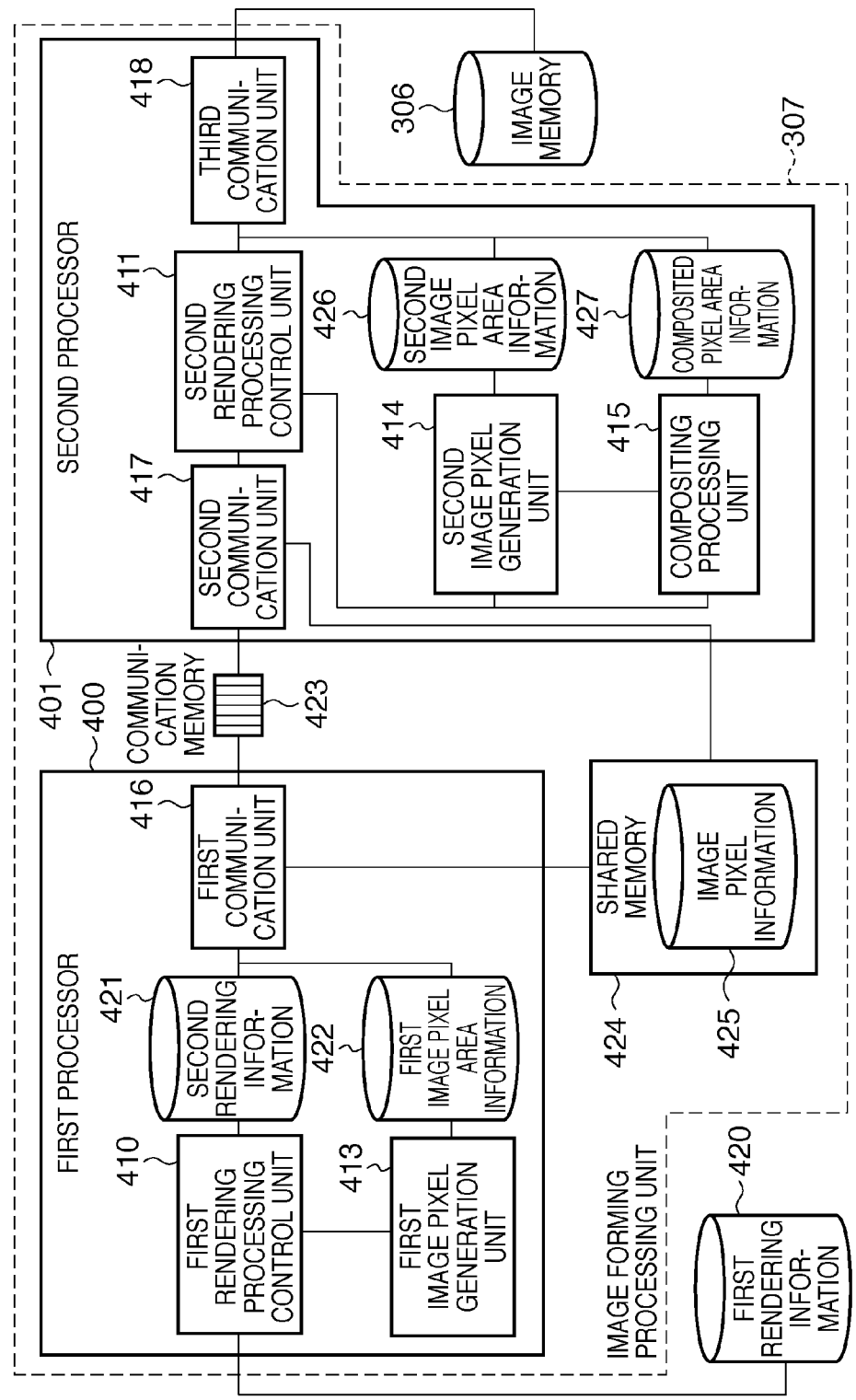
FIG. 4A is a schematic block diagram showing an example of the arrangement of an image forming processing unit shown in FIG. 3.

FIG. 4A is a block diagram showing an example of the overall arrangement of the image forming processing unit 307 of this embodiment.

The image forming processing unit 307 of this embodiment adopts an arrangement in which a plurality of processors (a first processor 400 and second processor 401) are connected in series.

In the arrangement in which the processors are connected in series, the first processor 400 connected in the former stage includes a first rendering processing control unit 410, first image pixel generation unit 413, and first communication unit 416.

The first rendering processing control unit 410 operates by externally receiving first rendering information 420. The first rendering processing control unit 410 analyzes the first rendering information 420, and generates second rendering information 421 as information required to control the second processor 401. Also, the first rendering processing control unit 410 instructs the first image pixel generation unit 413 to execute an image pixel generation process as needed based on the data analysis result, thereby generating first image pixel information 422.

The first image pixel generation unit 413 generates the first image pixel information 422 in response to the instruction from the first rendering processing control unit 410.

The first communication unit 416 executes a transfer process of the second rendering information 421 generated by the first rendering processing control unit 410, and the first image pixel information 422 generated by the first image pixel generation unit 413 as needed to the second processor 401. Upon transferring the first image pixel information 422, the first communication unit 416 executes a process for switching a transfer method according to the first image pixel information 422 generated by the first image pixel generation unit 413. As will be described later, the transfer method is switched between that in a pixel unit and that in a layer unit (composited objects are called a layer in this example). Furthermore, the first communication unit 416 executes a process for switching a destination of the generated first image pixel information between a communication memory 423 and shared memory 424 based on the second rendering information 421.

The second processor 401 connected in the latter stage will be described below.

The second processor 401 includes a second rendering processing control unit 411, second image pixel generation unit 414, compositing processing unit 415, second communication unit 417, and third communication unit 418.

The second rendering processing control unit 411 executes an analysis process of the second rendering information 421 acquired by the second communication unit 417. The second rendering processing control unit 411 instructs the second image pixel generation unit 414 to generate second image pixel information 426 according to the designated information. Furthermore, the second rendering processing control unit 411 instructs the compositing processing unit 415 to generate composited pixel information 427 indicating a result of the compositing processing.

The second image pixel generation unit 414 generates the second image pixel information 426 in response to the instruction from the second rendering processing control unit 411.

The compositing processing unit 415 executes a compositing processing in response to the instruction from the second rendering processing control unit 411, and generates the composited pixel information 427.

The second communication unit 417 acquires the second rendering information 421 transferred by the first communication unit 416 from the communication memory 423. The second communication unit 417 analyzes the acquired second rendering information 421, and acquires the first image pixel information 422 from designated one of the communication memory 423 and shared memory 424 as needed.

The third communication unit 418 acquires the second image pixel information 426 or composited pixel information 427 based on the second rendering information 421, and outputs the acquired information to the image memory 306 in FIG. 3.

(Arrangement Example of First Processor)

FIG. 4B is a block diagram showing an example of the hardware arrangement of the first processor 400 which executes flowcharts to be described later.

Referring to FIG. 4B, reference numeral 4001 denotes a CPU which controls the operation of the first processor 400 and implements the first rendering processing control unit 410. Reference numeral 4002 denotes a RAM which stores programs and data required for the operation of the CPU 4001.

On the RAM 4002, areas for storing the following information are assured. Reference numeral 420 denotes an area for storing the first rendering information. Reference numeral 421 denotes an area for storing the second rendering information. Reference numeral 4021 denotes an area for storing a variable "Level" indicating a currently processed layer level. Reference numeral 4022 denotes an area for storing a compositing complexity used to control load sharing to the first and second processors 400 and 401 by analyzing the first rendering information. Reference numeral 4023 denotes an area for storing a threshold value of a pixel length used to determine which of the communication memory 423 and shared memory 424 is used to transfer the first image pixel information 422. Reference numeral 4024 denotes an area for storing information indicating whether generated pixel information is output to the communication memory 423 or shared memory 424, based on the threshold value 4023 of the pixel length, and the pixel length to be rendered.

Reference numeral 4025 denotes an area for storing a variable "Length" indicating the pixel length of a currently processed layer. Reference numeral 4026 denotes an area for storing a variable "count" indicating the number of currently processed pixels. Reference numeral 4027 denotes an area for storing a pixel value generated by the first image pixel generation unit 413. Reference numeral 4028 denotes a storage area used to generate layer type information of the second rendering information 421.

Reference numeral 4029 denotes a program load area on which a program to be executed by the CPU 4001 is loaded from the ROM 303 in FIG. 3.

Reference numeral 4003 denotes a CPU bus connection unit which receives, via the CPU bus 320, the first rendering information 420 (prepared in the image control information memory 308 in FIG. 3 in this example) transferred based on the instruction from the CPU 305 in FIG. 3.

After these units, the first image pixel generation unit 413 and first communication unit 416, which are implemented by hardware in this example, are connected.

(Arrangement Example of Second Processor)

FIG. 4C is a block diagram showing an example of the hardware arrangement of the second processor 400 which executes flowcharts to be described later.

Referring to FIG. 4C, reference numeral 4011 denotes a CPU which controls the operation of the second processor 401, and implements the second rendering processing control unit 411. Reference numeral 4012 denotes a RAM which stores programs and data required for the operation of the CPU 4011.

On the RAM 4012, areas for storing the following information are assured. Reference numeral 421 denotes an area for storing the second rendering information. Reference numeral 4031 denotes an area for storing a variable "Level" indicating a currently processed layer level. Reference numeral 4032 denotes an area for storing a value "Length" indicating the pixel length of a currently processed layer. Reference numeral 4033 denotes an area for storing a variable "count" indicating the number of currently processed pixels.

Reference numeral 4034 denotes an area for storing pixel information (Source 1) of a preceding layer in case of a parallel layer generation process in this example. Reference numeral 4035 denotes an area for storing pixel information (Source 2) of a succeeding layer in case of the parallel layer generation process in this example. Reference numeral 4036 denotes an area for storing pixel information as the execution result of the pixel generation process or compositing processing, i.e., pixel or layer information (Destination) as a source to further undergo the compositing processing in the current layer level. Reference numeral 4037 denotes an area for storing pixel or layer information (Result) as the execution result of the current compositing processing.

Reference numeral 4038 denotes a program load area on which a program to be executed by the CPU 4011 is loaded from the ROM 303 in FIG. 3.

After these units, the second image pixel generation unit 414, compositing processing unit 415, second communication unit 417, and third communication unit 418, which are implemented by hardware in this example, are connected.

(Example of Drawing Area)

Figure 4D:
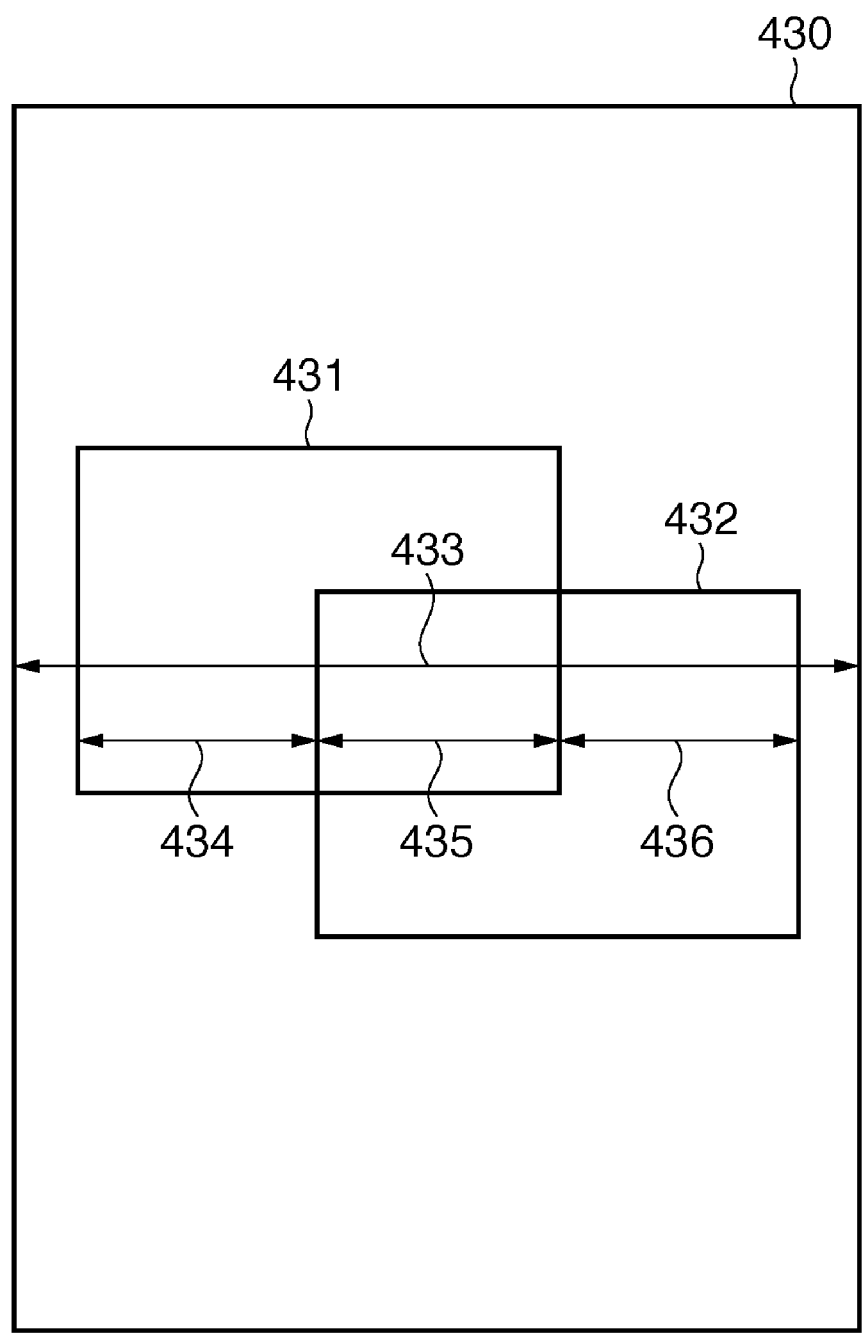
FIG. 4D is a view showing an example of drawing areas to be processed by the image forming processing unit of this embodiment.

FIG. 4D is a view showing an example of drawing areas to be processed by the image forming processing unit of this embodiment.

Reference numeral 430 denotes a page area in which image forming processing is performed. Reference numerals 431 and 432 denote drawing objects included in the page area 430. Reference numeral 433 denotes a scan line obtained by segmenting the page area to be processed by the image forming processing unit of this embodiment in a line unit of a main scanning direction. Reference numerals 434, 435, and 436 denote closed regions obtained by segmenting the page area to be processed by the image forming processing unit of this embodiment into regions between edges of objects. The image forming processing unit of this embodiment executes a drawing process for the aforementioned scan line or each closed region between the edges of objects. Therefore, the first rendering information and second rendering information to be described below indicate information of the aforementioned scan line or each closed region segmented between the edges of objects.

(Configuration Example of First Rendering Information)

Figure 5:
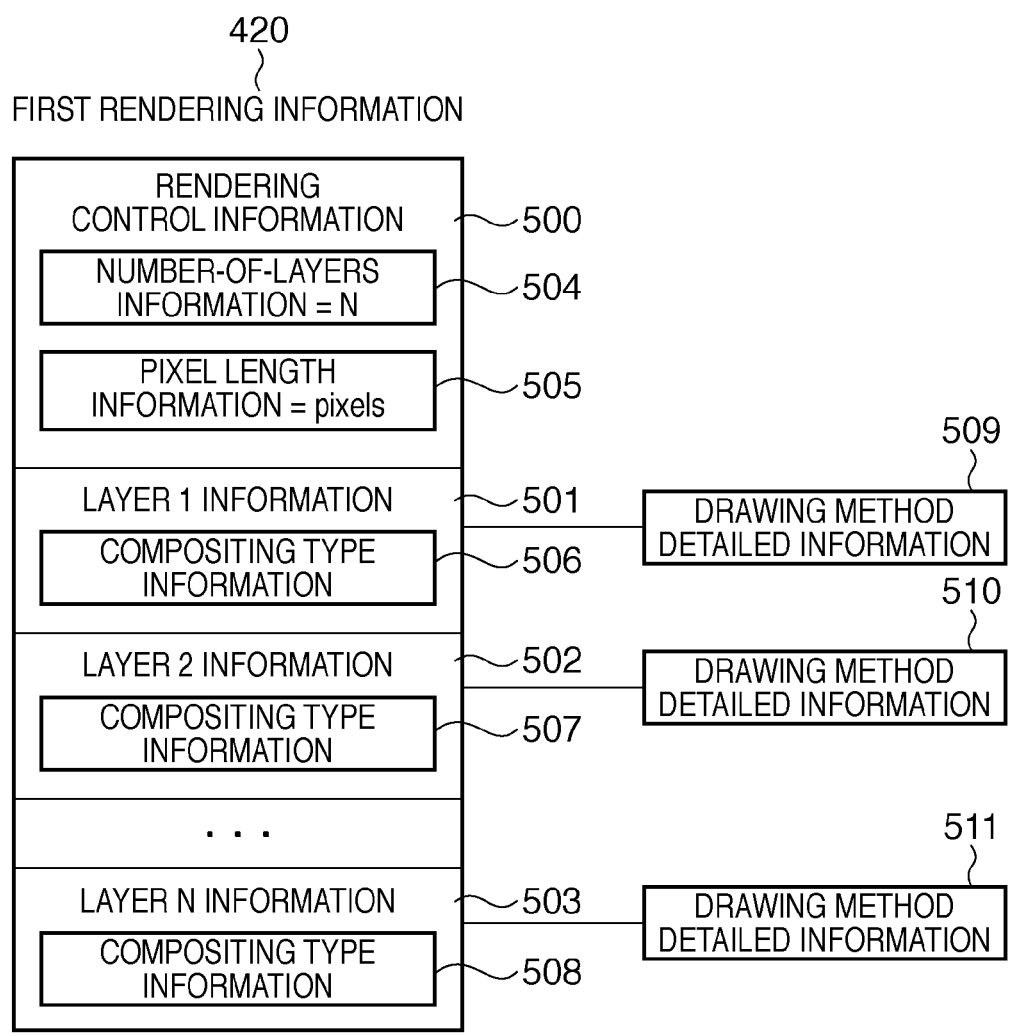
FIG. 5 is a view showing a data format example of first rendering information of this embodiment.

FIG. 5 is a view showing an example of the configuration of the data format of the aforementioned first rendering information 420.

The first rendering information 420 includes rendering control information 500, and a plurality of pieces of layer information 501, 502, . . . , 503, and defines a line region indicating a compositing state of an identical object. Therefore, an image for one line and also an image for one page are generated by a plurality of pieces of first rendering information 420.

The rendering control information 500 holds number-of-layers information 504 and pixel length information 505.

The number-of-layers information 504 indicates the number of pieces of layer information 501, 502, . . . , 503 that follow the rendering control information 500. The first rendering processing control unit 410 loads the pieces of layer information 501, 502, . . . , 503 as many as the required number of layers based on this number-of-layers information 504, and executes processes for respective layers.

The pixel length information 505 indicates a pixel length generated in each layer. The first rendering processing control unit 410 passes this pixel length information 505 and the pieces of layer information 501, 502, . . . , 503 to the first image pixel generation unit 413, and instructs the unit 413 to execute a pixel generation process.

The layer 1 information 501, layer 2 information 502, . . . , layer N information 503 respectively indicate detailed information required to execute drawing processes of respective layers to be drawn. The layer 1 information 501, layer 2 information 502, and layer N information 503 respectively hold pieces of compositing type information 506, 507, and 508. Also, the layer 1 information 501, layer 2 information 502, and layer N information 503 hold pieces of drawing method detailed information 509, 510, and 511 as needed. The drawing method detailed information indicates scaling information, color conversion information, and the like as typical information, but may hold other kinds of information.

The pieces of compositing type information 506, 507, and 508 indicate a compositing processing method indicating how to composite pixels of respective layers. This value indicates, e.g., a compositing processing of GDI, or that of PDF.

(Configuration Example of Second Rendering Information)

Figure 6:
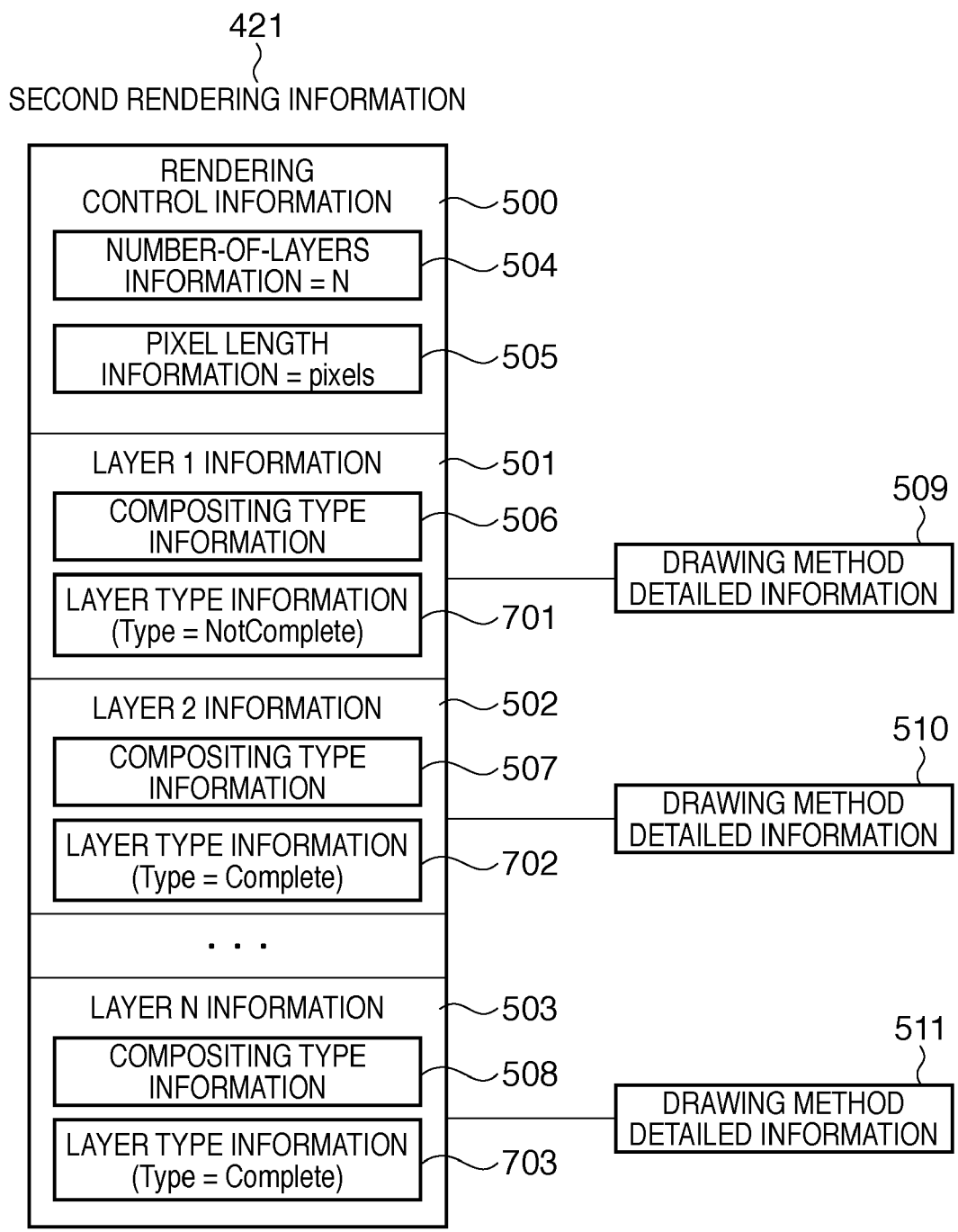
FIG. 6 is a view showing a data format example of second rendering information of this embodiment.

FIG. 6 shows the format of the second rendering information 421, which is generated by the first rendering processing control unit 410 of the first processor 400, and is used by the second rendering processing control unit 411 of the second processor 401.

Except for pieces of layer type information 701, 702, and 703, all pieces of information are the same as those generated in FIG. 5.

The pieces of layer type information 701, 702, and 703 indicate whether or not the first rendering processing control unit 410 instructs the first image pixel generation unit 413 to execute a pixel generation process, and to generate the first image pixel information 422. In this example, when the first rendering processing control unit 410 instructs to execute a parallel layer generation process, the layer type information stores "Parallel". When the first rendering processing control unit 410 instructs to execute a single layer generation process, the layer type information stores "complete". On the other hand, when the first processor 400 skips a layer generation process, and instructs the second processor to execute a layer generation process, the layer type information stores "not complete".

<Operation Example of Image Forming Processing Unit of this Embodiment>

(Operation Sequence Example of First Rendering Processing Unit)

Figure 7:
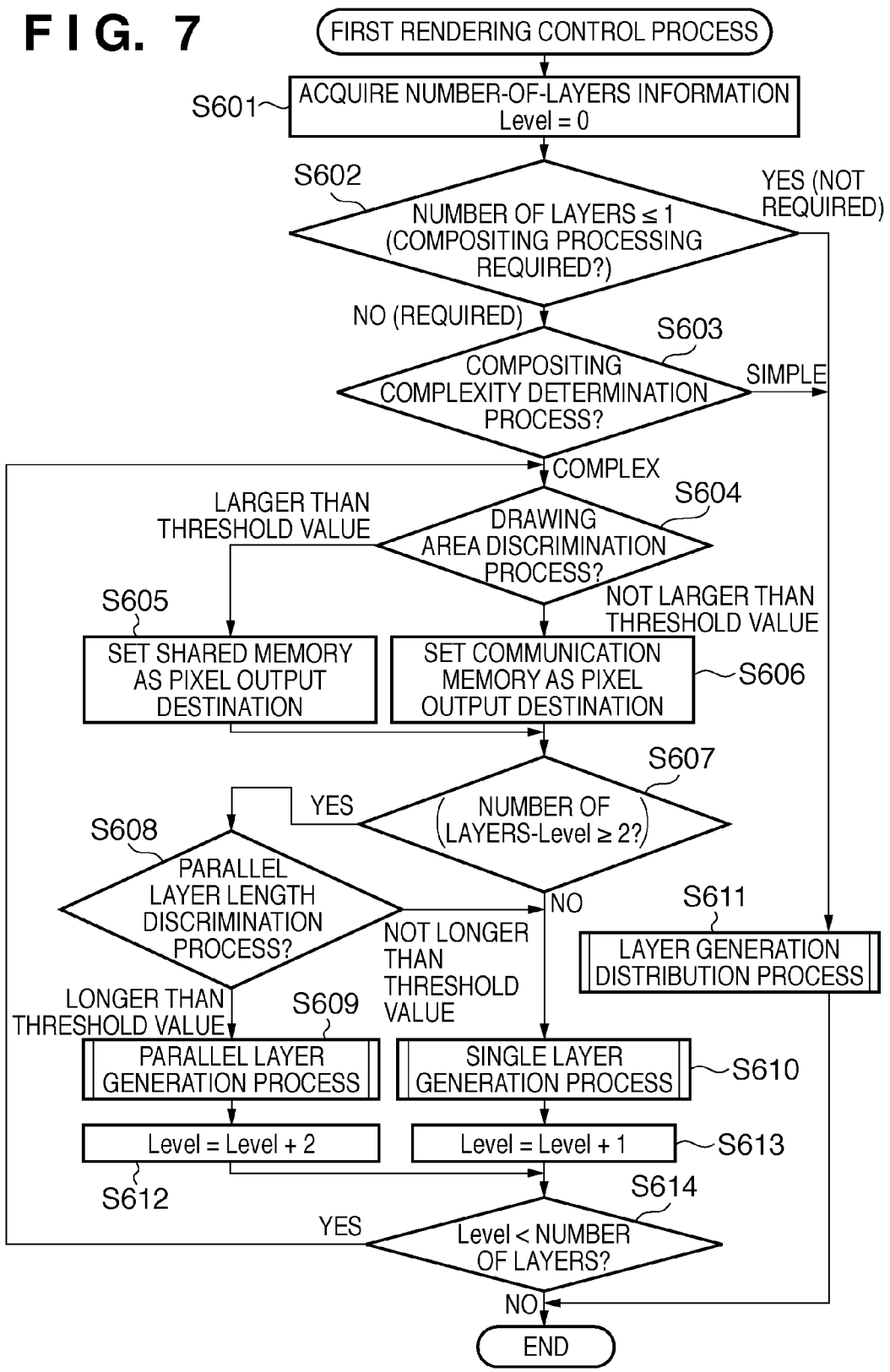
FIG. 7 is a flowchart showing the processing sequence for implementing a first rendering control processing unit by the first processor shown in FIG. 4B.

FIG. 7 is a flowchart showing an example of the operation sequence of the CPU 4001, which implements the first rendering processing control unit 410.

The CPU 4001 of the first rendering processing control unit 410 executes an initialization process of respective parameters required for a rendering control process in step S601. In the process to be executed in this step, the CPU 4001 executes an acquisition process of the rendering control information 500 from the first rendering information 420. Furthermore, the CPU 4001 executes an acquisition process of the number-of-layers information 504 from the acquired rendering control information 500. Also, the CPU 4001 initializes information (a variable "Level" in this case) indicating the number of processed layers to zero.

The process advances to step S602, and the CPU 4001 executes a determination process as to whether or not the acquired number-of-layers information 504 assumes a value not larger than 1 (i.e., whether or not to require a compositing processing). If the number-of-layers information 504 assumes a value not larger than 1, since no compositing processing is required, the process advances to step S611; otherwise, since a compositing processing is required, the process advances to step S603.

In step S603, the CPU 4001 executes an acquisition process of all pieces of layer information included in the first rendering information 420, and extracts compositing type information from the pieces of acquired layer information. Then, the CPU 4001 executes a determination process of a complexity of the compositing processing based on the extracted compositing type information. As a result of the determination process, if it is determined that the compositing processing is "simple", the process advances to step S611; if it is determined that the compositing processing is "complex", the process advances to step S604.

As the determination process of the complexity of the compositing processing, whether the compositing processing is "simple" or "complex" is determined in advance for respective types of compositing processing. Then, the determination process is executed based on that information. In practice, when only a simple compositing processing of, e.g., GDI is required, it is determined in advance to decide a "simple" compositing processing. On the other hand, when a complex compositing processing of, e.g., PDF is required, it is determined in advance to decide a "complex" compositing processing. Furthermore, when a process of a transparent value is not required, a "simple" compositing processing is determined; when a process of a transparent value is required, a "complex" compositing processing is determined. Moreover, when the number of objects to be composited is not larger than a predetermined threshold value, a "simple" compositing processing is determined; when the number of objects to be composited is not smaller than the predetermined threshold value, a "complex" compositing processing is determined.

The CPU 4001 determines in step S604 based on the pixel length information 505 if the pixel length is larger than a predetermined threshold value of a pixel length. If the pixel length is not larger than the predetermined threshold value, the process advances to step S606; if the pixel length is larger than the threshold value, the process advances to step S605. In step S605, the CPU 4001 sets the shared memory 424 as the output destination of pixels generated by a pixel generation process (to be described later). On the other hand, in step S606 the CPU 4001 sets the communication memory 423 as the output destination of pixels generated by a pixel generation process (to be described later). As the threshold value, for example, 100 pixels, which do not impose any memory mapping load, are used. However, the threshold value is not particularly limited.

The CPU 4001 determines in step S607 whether or not the number of layers to be processed (i.e., corresponding to the number of layers—"Level") is two or more. If the number of layers to be processed is two or more, the process advances to step S608; otherwise, the process advances to step S610. The CPU 4001 determines in step S608 based on the pixel length information 505 if the pixel length is not larger than a threshold value of a pixel length. As the threshold value, for example, 100 pixels, which do not impose any memory mapping load, are used. However, the threshold value is not particularly limited.

This determination step is executed for the following reason. When the pixel length is not larger than the threshold value, since the number of tasks spent by a pixel management process as the conventional problem is reduced in a parallel layer generation process to be executed in step S609, the parallel layer generation process may have no effect. Hence, in order to determine the effect of the parallel layer generation process, the pixel length is determined in step S608. If the pixel length is not longer than the threshold value, the process advances to step S610; if the pixel length is longer than the threshold value, the process advances to step S609.

In step S609, the CPU 4001 executes a parallel generation process of image pixels for two layers. In this parallel layer generation process, the CPU 4001 acquires pieces of layer information for two layers (Level, Level+1) to be processed from those acquired in step S601. Assume that the CPU 4001 acquires, for example, the layer 1 information 501 and layer 2 information 502 in this step. In this case, the CPU 4001 executes an image pixel generation process based on the two pieces of drawing method detailed information 509 and 510. The pixel generation process in this step is a process for generating pixels in parallel as many as the number of pixels indicated by the pixel length information 505 for two layers in a pixel unit based on the scaling information and color conversion information included in the pieces of drawing method detailed information 509 and 510. Details of this process will be described later with reference to FIGS. 8A and 11.

In step S610, the CPU 4001 executes an image pixel generation process for single layer. In this single layer generation process, the CPU 4001 acquires layer information for one layer (Level) to be processed from those acquired in step S601. Assume that the CPU 4001 acquires the layer 1 information 501 in this step. In this case, the CPU 4001 executes an image pixel generation process based on the drawing method detailed information 509. In the pixel generation process in this step, pixels as many as the number of pixels indicated by the pixel length information 505 are generated based on the scaling information and color conversion information included in the drawing method detained information 509. Details of this process will be described later with reference to FIGS. 8B and 10.

In step S611, the CPU 4001 skips an image pixel generation process in the first processor 400, and instructs the second processor 401 located in the latter stage to execute the image pixel generation process. Details of this process will be described later with reference to FIG. 8C.

Since the CPU 4001 completes the process for two layers in the parallel layer generation process S609, it counts up the number of layers to Level+2 in step S612. On the other hand, since the CPU 4001 completes the process for single layer in the single layer generation process S610, it counts up the number of layers to Level+1 in step S613.

In step S614, the CPU 4001 compares the number of processed layers (Level) with the number-of-layers information 504. If the number of layers is smaller than the number-of-layers information 504, the CPU 4001 continues processing; if the number of layers is not smaller than the number-of-layers information 504, it ends the processing.

(Parallel Layer Generation Process S609)

Figure 8A:
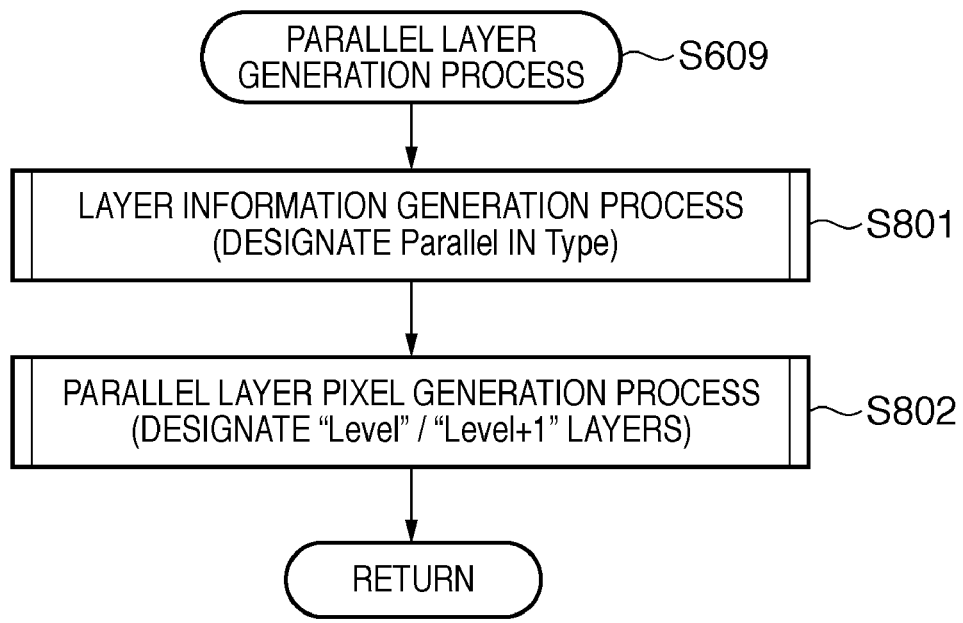
FIG. 8A is a flowchart showing an example of the processing sequence of a parallel layer generation process S609 in FIG. 7.

FIG. 8A is a flowchart showing details of the parallel layer generation process S609 in FIG. 7.

In step S801, the CPU 4001 generates pieces of layer type information of two layers (Level, Level+1), the parallel layer generation process of which is to be executed, and sets a type (identified by a value "Parallel" in this case) indicating execution of the parallel layer generation process.

In step S802, the CPU 4001 actually executes a parallel generation process of image pixels for two layers. Details of this step will be described later with reference to FIG. 11.

(Single Layer Generation Process S610)

Figure 8B:
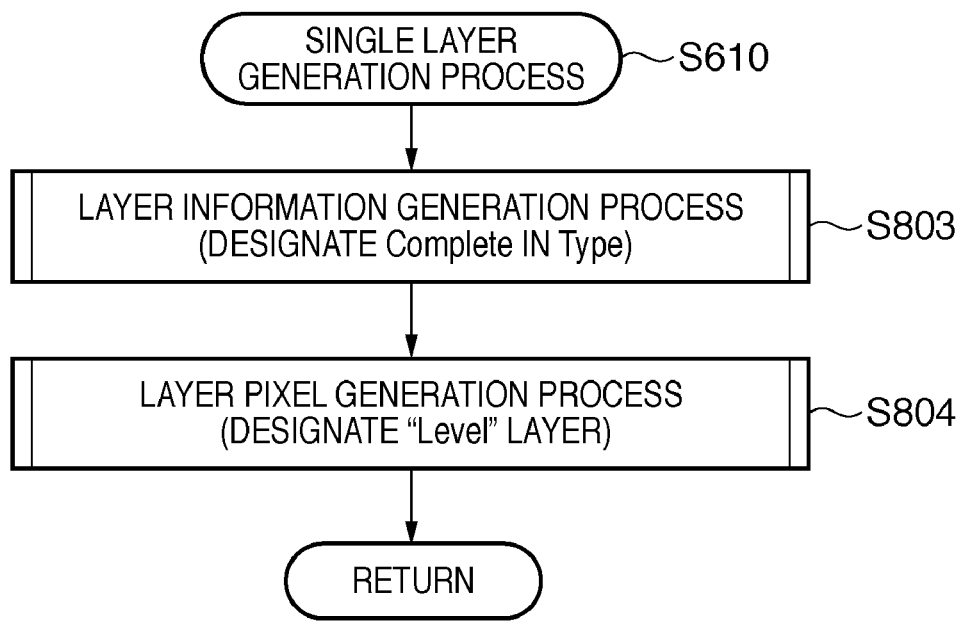
FIG. 8B is a flowchart showing an example of the processing sequence of a layer generation process S619 in FIG. 7.

FIG. 8B is a flowchart showing details of the single layer generation process S610 in FIG. 7.

In step S803, the CPU 4001 generates layer type information of one layer (Level), the layer generation process of which is to be executed, and sets a type (identified by a value "complete" in this case) indicating execution of the layer generation process.

In step S804, the CPU 4001 actually executes a generation process of image pixels for one layer. Details of this step will be described later with reference to FIG. 10.

(Layer Generation Distribution Process S611)

Figure 8C:
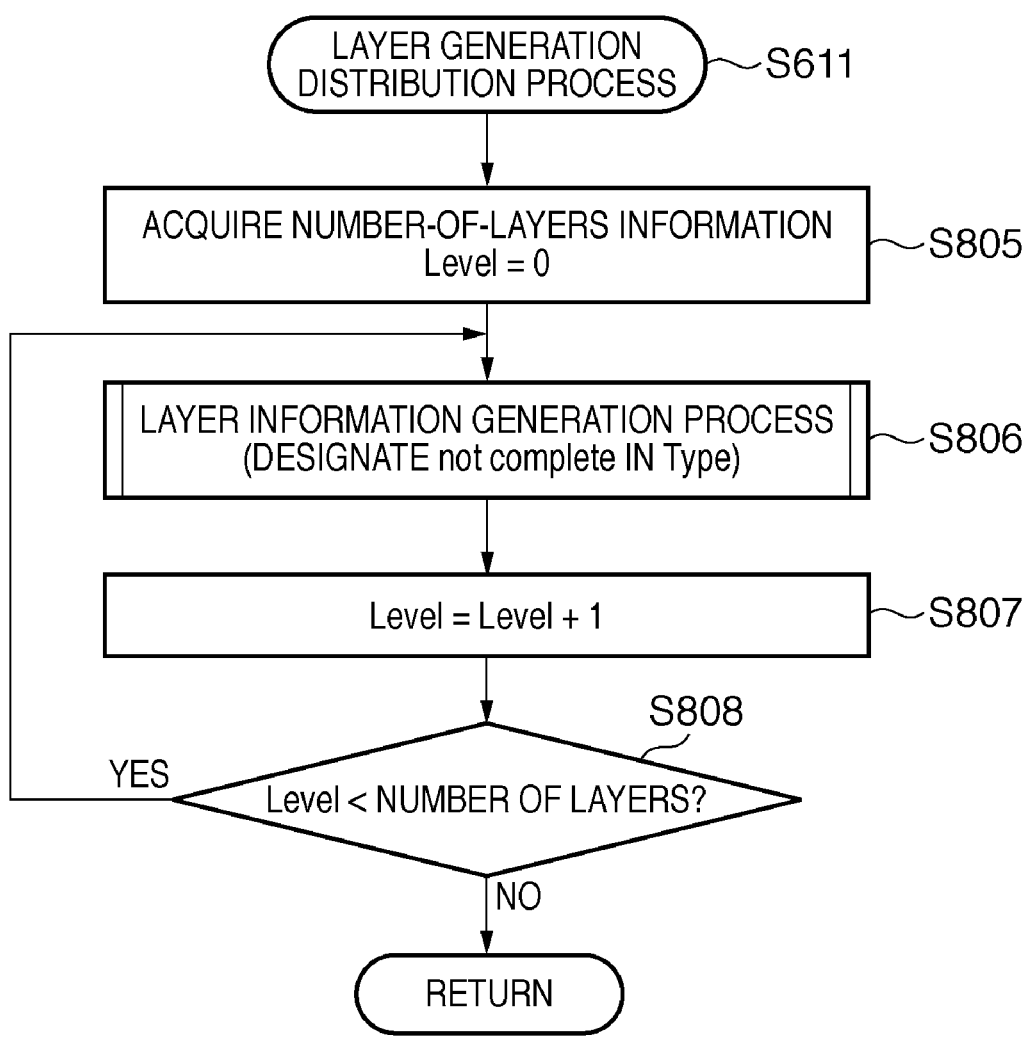
FIG. 8C is a flowchart showing an example of the processing sequence of a layer pixel distribution process S611 in FIG. 7.

FIG. 8C is a flowchart showing details of the layer generation distribution process S611 in FIG. 7.

In step S805, the CPU 4001 executes an acquisition process of the number-of-layers information 504, and initializes information (a variable "Level" in this case) indicating the number of processed layers to zero.

In step S806, the CPU 4001 generates layer type information, and sets a type (identified by a value "not complete" in this case) indicating distribution of an image pixel generation process to the second processor 401 located in the latter stage in the layer type information.

In step S807, the CPU 4001 counts up the number of processed layers by Level+1. In step S808, the CPU 4001 compares the number of processed layers with the number-of-layers information 504 to determine if the processing is completed.

Note that the layer generation distribution process S611 of this embodiment is executed only for a case in which the number of layers is 1. However, the CPU 4001 may distribute the layer generation process to the second processor 401 for a plurality of layers, and the number of layers may be changed in corresponding with the load of the compositing processing to be executed by the second processor 401. Alternatively, a background may be included as layer 0, and the CPU 4001 may distribute a layer generation process of layers 0 and 1 to the second processor 401 in the layer generation distribution process S611.

(Layer Information Generation Processes S801, S803, and S806)

Figure 9:
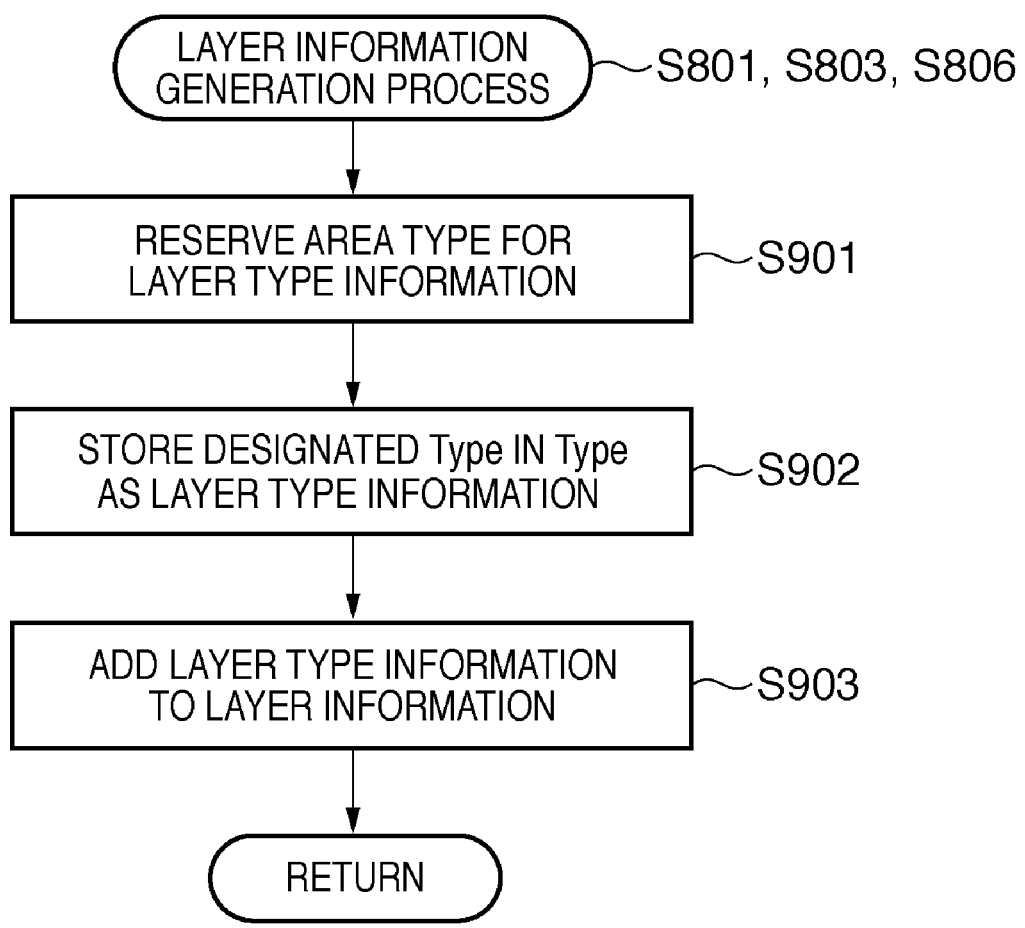
FIG. 9 is a flowchart showing an example of the processing sequence of layer information generation processes S801, S803, and S806 in FIGS. 8A to 8C.

FIG. 9 is a flowchart showing details of the layer information generation process (S801, S803, and S806) shown in FIGS. 8A to 8C.

In step S901, the CPU 4001 assures the layer type information area 4028. In step S902, the CPU 4001 stores respective kinds of type information corresponding to FIGS. 8A to 8C ("Parallel", "Complete", and "not complete") in the layer type information assured in step S901. In step S903, the CPU 4001 adds the respective kinds of type information corresponding to FIGS. 8A to 8C ("Parallel", "Complete", and "not complete") prepared in step S902 to layer information in the second rendering information 421.

(Layer Pixel Generation Processes S804, S1405, and S1410)

Figure 10:
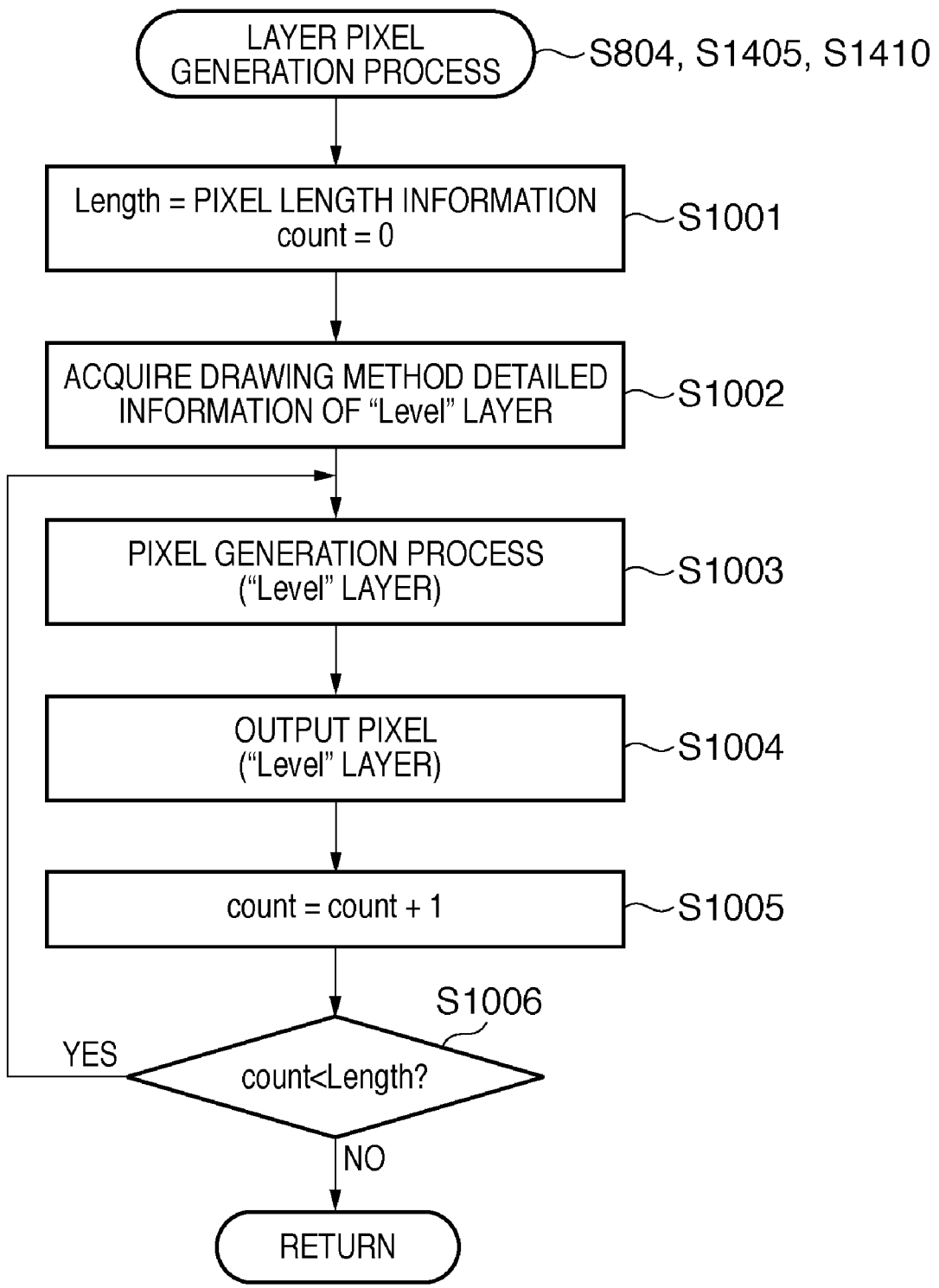
FIG. 10 is a flowchart showing an example of the processing sequence of layer pixel generation processes S604, S1405, and S1410 in FIGS. 8B and 14.

FIG. 10 is a flowchart showing details of the layer pixel generation process (S804) shown in FIG. 8B. Note that the CPU 4011 executes the same sequence as that of the layer pixel generation process in FIG. 10 in layer pixel generation processes (S1405 and S1410) to be executed by the second processor 401.

In step S1001, the CPU 4001 executes an initialization process of respective parameters required for the layer pixel generation process. For example, the CPU 4001 initializes information (a variable "count" in this case) indicating the number of processed pixels to zero. Furthermore, the CPU 4001 executes an acquisition process of the pixel length information 505 described using FIG. 5. In step S1002, the CPU 4001 executes an acquisition process of the drawing method detailed information. Assume that the CPU 4001 acquires the drawing method detailed information for the "Level" layer in this step.

In step S1003, the CPU 4001 instructs the first image pixel generation unit 413 to execute a pixel generation process of the "Level" layer. In this step, the first image pixel generation unit 413 executes a generation process of the "count" pixel. Note that the pixel generation process in this case generates the "count" pixel based on, e.g., the scaling information and color conversion information included in the drawing method detailed information acquired in step S1002. Note that the CPU 4011 instructs the second image pixel generation unit 414 in steps S1405 and S1410 in the second processor 401.

In step S1004, the CPU 4001 outputs the pixel generated in step S1003 to the second processor 401 via a communication. The CPU 4001 switches the output destination of the pixel used in the communication based on the output destination 4024, which has already been set in steps S604 to S606 in FIG. 7 based on the pixel length information 505. That is, when the pixel length information 505 is not larger than the threshold value, the CPU 4001 uses the communication memory 423 as the output destination. On the other hand, when the pixel length information is larger than the threshold value, the CPU 4001 makes a communication using the shared memory 424 as the output destination.

In step S1005, the CPU 4001 executes a process for incrementing the number of generated pixels by count+1. As a result of this process, the CPU 4001 manages the number of generated pixels. In step S1006, the CPU 4001 compares the number of processed pixels (count) with the pixel length information (Length), thus determining if the processing is completed. If the number of pixels (count) is less than the pixel length information (Length) and the processing is not complete yet, the process returns to step S1003; if the number of pixels (count) is not less than the pixel length information (Length), and the processing is complete, the CPU 4001 ends this processing.

(Parallel Layer Pixel Generation Process S802)

FIG. 11 is a flowchart showing details of the parallel layer pixel generation process (S802) shown in FIG. 7.

In step S1101, the CPU 4001 executes an initialization process of respective parameters required for the parallel layer generation process. For example, the CPU 4001 initializes information (a variable "count" in this case) indicating the number of processed pixels to zero. Furthermore, the CPU 4001 executes an acquisition process of the pixel length information 505 described using FIG. 5. In step S1102, the CPU 4001 executes an acquisition process of the drawing method detailed information. In this step, the CPU 4001 acquires pieces of drawing method detailed information for the "Level" and "Level+1" layers.

In step S1103, the CPU 4001 instructs the first image pixel generation unit 413 to execute a pixel generation process of the "Level" layer. In this step, the first image pixel generation unit 413 executes a generation process of the "count" pixel. Also, the pixel generation process generates the "count" pixel based on, for example, the scaling information and color conversion information included in the drawing method detailed information acquired in step S1102. In step S1104, the CPU 4001 outputs the pixel generated in step S1103 to the second processor 401 via a communication. The CPU 4001 switches the output destination of the pixel used in the communication to that which has already been set based on the pixel length information 505. That is, when the pixel length information 505 is not larger than the threshold value, the CPU 4001 makes a communication using the communication memory 423. On the other hand, when the pixel length information is larger than the threshold value, the CPU 4001 makes a communication using the shared memory 424.

In step S1105, the CPU 4001 instructs the first image pixel generation unit 413 to execute a pixel generation process of the "Level+1" layer. In this step, the first image pixel generation unit 413 executes a generation process of the "count+1" pixel. Also, the pixel generation process generates the "count+1" pixel, for example, based on the scaling information and color conversion information included in the drawing method detailed information acquired in step S1102. In step S1106, the CPU 4001 outputs the pixel generated in step S1105 to the second processor 401 via a communication. The CPU 4001 switches the output destination of the pixel used in the communication to that which has already been set based on the pixel length information 505. That is, when the pixel length information 505 is not larger than the threshold value, the CPU 4001 makes a communication using the communication memory 423. On the other hand, when the pixel length information is larger than the threshold value, the CPU 4001 makes a communication using the shared memory 424.

In step S1107, the CPU 4001 executes a process for incrementing the number of generated pixels by count+1. As a result of this process, the CPU 4001 manages the number of generated pixels. In step S1108, the CPU 4001 compares the number of processed pixels (count) with the pixel length information (Length), thus determining if the processing is completed. If the number of pixels (count) is less than the pixel length information (Length) and the processing is not complete yet, the process returns to step S1103; if the number of pixels (count) is not less than the pixel length information (Length), and the processing is complete, the CPU 4001 ends this processing.

<Practical Example of Parallel Layer Generation Process of this Embodiment>

The merit in the image processing method and, especially, the communication method as a result of execution of the parallel layer generation process S609 as a characteristic feature of this embodiment will be described below with reference to FIG. 12 and FIGS. 13A to 13C. For example, the pixel generation process of Run Length 1 indicating pixels of layer 1 and Run Length 2 indicating pixels of layer 2 of one image area will be described below.

(Pixel Generation in Layer Unit)

Assume that pixels of the Run Lengths are generated in a layer unit, and every time pixels of each layer are generated, they are output to the communication memory 423 (corresponding to a process for repeating step S610 in FIG. 7). At this time, the storage state in the communication memory 423 is indicated by communication state 1 in FIG. 12. Communication state 1 indicates an output example in the pixel order.

A process time 1300 of the first processor 400 is the sum of a pixel generation process time 1304 indicating a generation process time of Run Length 1, and a pixel generation process time 1305 indicating a generation process time of Run Length 2, as shown in FIG. 13A. In this case, the second processor 401 is required to execute an unnecessary pixel acquisition process upon execution of a compositing processing of the pixels of Run Length 1 and Run Length 2. Furthermore, the second processor 401 is also required to execute a management process of the acquired pixels using the memory. For example, upon execution of a compositing processing of pixels "1" and "6", the second processor 401 has to execute an acquisition process of data of pixels "1" to "5" from the first processor 400, and also manage the acquired pixels in the memory before it acquires pixel "6". Therefore, as a process time 1301 of the second processor 401, a compositing processing time 1307 and a memory read-out process time 1308 are basically required, but a management process including a memory write process time 1306 is also separately required.

(Pixel Generation of Two Layers in Pixel Unit)

On the other hand, as in the processes in steps S1103 to S1106 in FIG. 11, by alternately outputting pixels of Run Length 1 and Run Length 2 to the communication memory 423, communication state 2 in FIG. 12 is obtained.

Then, the second processor 401 can acquire only pixels "1" and "6", and the need for the wasteful acquisition process and management process (memory write process time 1306) can be obviated. Since data can be directly acquired from a memory having a queue that allows fast access, deterioration of performance due to memory latency can be avoided. As a result, a second processor process time 1303 includes only a compositing processing time 1310 and memory read-out process time 1311.

In this way, as shown in FIG. 13B, a memory access time 1312 in a layer unit is shortened to a memory access time 1313 in a pixel unit, and the efficiency of the second processor process time 1303 can be improved compared to the second processor process time 1301.

(Compositing Processing Example of Three or More Layers)

Figure 13C:
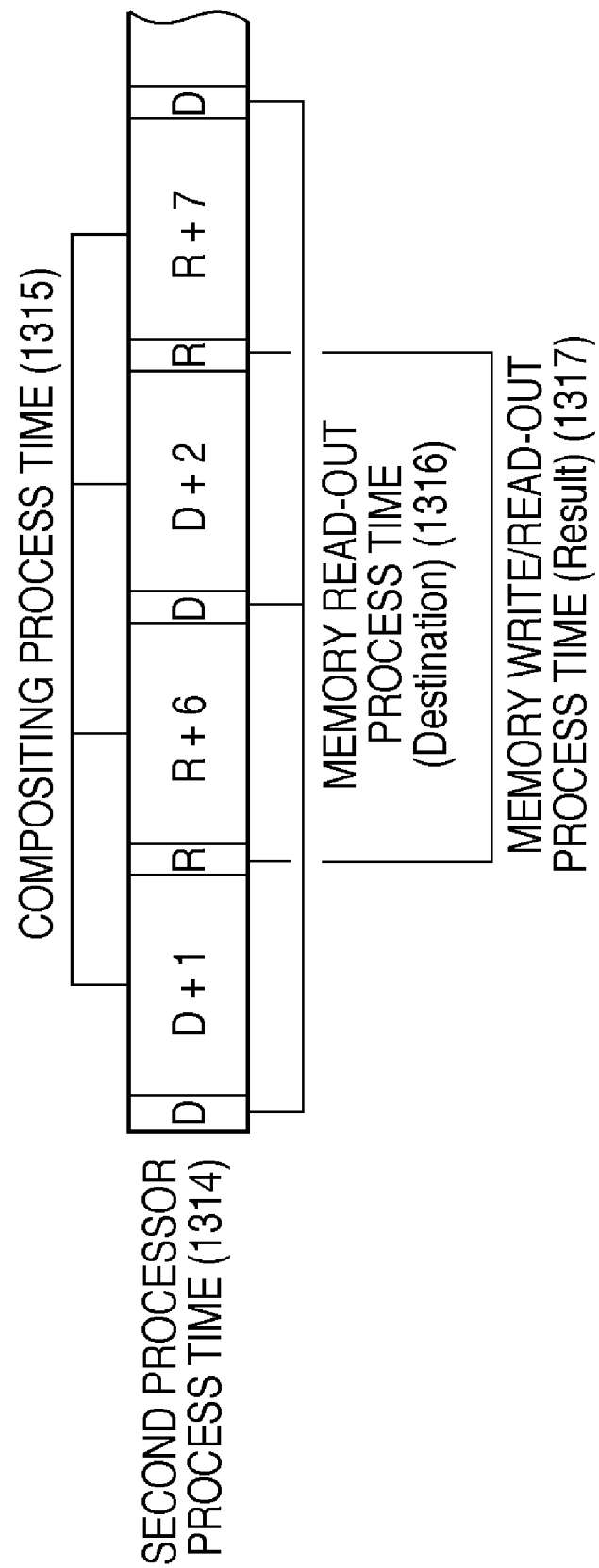
FIG. 13C is a timing chart showing the process time when the second processor of the image forming processing unit of this embodiment performs a compositing processing of three or more layers.

FIGS. 13A and 13B show the efficiency improvement in case of the compositing processing of two layers. FIG. 13C demonstrates that the efficiency of a compositing processing of three or more layers can be similarly improved.

In FIG. 13C, "D" represents "Destination" (the storage location of the result of the compositing processing executed so far) which is also used in FIGS. 15 and 16 to be described later. "R" similarly represents "Result" (the storage location of the result of the compositing processing).

The second processor process time in this case includes only a total of a read-out time 1316 of the result of the completed compositing processing, a compositing processing time 1315, and a write/read-out process time 1317 of the compositing processing result.

Therefore, in case of FIG. 13C as well, the need for the wasteful acquisition process and management time (memory write process time 1306) can be obviated compared to the process in a layer unit, as in FIG. 13A.

(Operation Sequence Example of Second Rendering Processing Unit)

Figure 14:
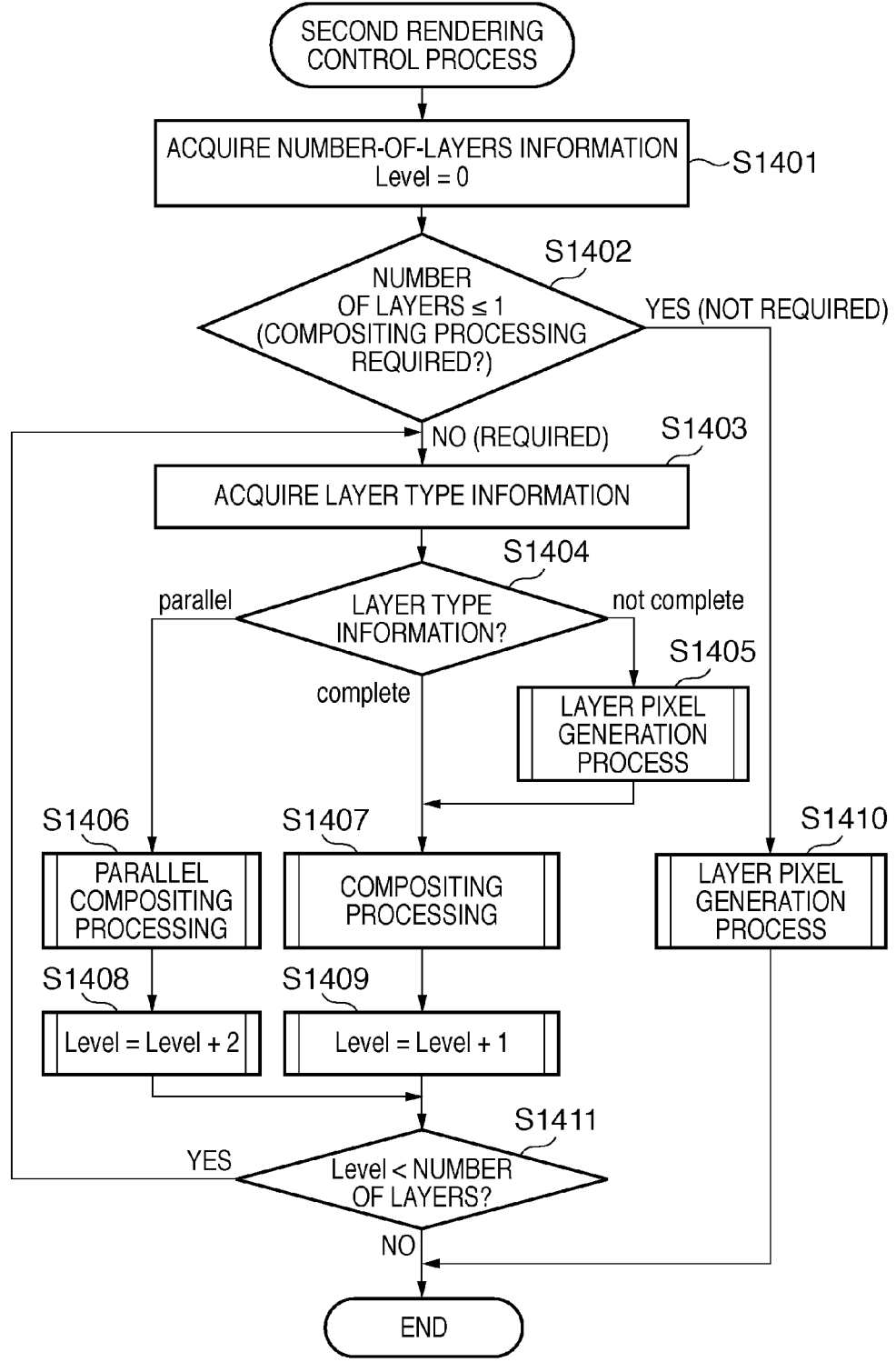
FIG. 14 is a flowchart showing the processing sequence for implementing a second rendering control processing unit by the second processor in FIG. 4C.

FIG. 14 is a flowchart showing the processing sequence of the rendering control process to be executed by the second rendering processing control unit 411.

The CPU 4011 of the second rendering processing control unit 411 executes an initialization process of respective parameters required for the rendering control process in step S1401. As the processes to be executed in this step, the CPU 4011 acquires the second rendering information 421 shown in FIG. 6 from the communication memory 423, and executes an acquisition process of the rendering control information 500 from the second rendering information 421. Furthermore, the CPU 4011 executes an acquisition process of the number-of-layers information 504 from the acquired rendering control information 500. Moreover, the CPU 4011 initializes information (a variable "Level" in this case) indicating the number of processed layers to zero.

The process advances to step S1402, and the CPU 4011 executes a determination process as to whether or not the acquired number-of-layers information 504 assumes a value not larger than 1 (whether or not to require a compositing processing). If the number-of-layers information 504 assumes a value not larger than 1, since no compositing processing is required, the process advances to step S1410; otherwise, since a compositing processing is required, the process advances to step S1403.

In step S1403, the CPU 4011 executes an acquisition process of layer information of the "Level" layer, and extracts layer type information from the layer information. In step S1404, the CPU 4011 executes a discrimination process of a value of the layer type information acquired in step S1403. If "parallel" is designated in the layer type information, the process advances to step S1406. If "complete" is designated in the layer type information, the process advances to step S1407. If "not complete" is designated in the layer type information, the process advances to step S1405.

Steps S1405 and S1410 indicate a generation process of image pixels for one layer. The CPU 4011 executes the same process as the layer pixel generation process shown in FIG. 10 using the second image pixel generation unit 414.

In step S1406, the CPU 4011 executes a compositing processing of pixels which are alternately output for respective layers in the parallel layer generation process S609 of the first processor 400. Details of this process will be described later with reference to FIG. 16.

In step S1407, the CPU 4011 executes a compositing processing of pixels output in the layer generation process S610 of the first processor 400. Details of this process will be described later with reference to FIG. 15.

Since the process for two layers is complete in the parallel compositing processing S1406, the CPU 4011 counts up the number of layers to Level+2 in step S1408. On the other hand, since the process for one layer is complete in the compositing processing S1407, the CPU 4011 counts up the number of layers to Level+1 in step S1409.

In step S1411, the CPU 4011 compares the number of processed layers (Level) with the number-of-layers information 504. If the number of layers is smaller than the number-of-layers information 504, the CPU 4011 continues processing; if the number of layers is not smaller than the number-of-layers information 504, it ends the processing.

(Compositing Processing S1407)

Figure 15:
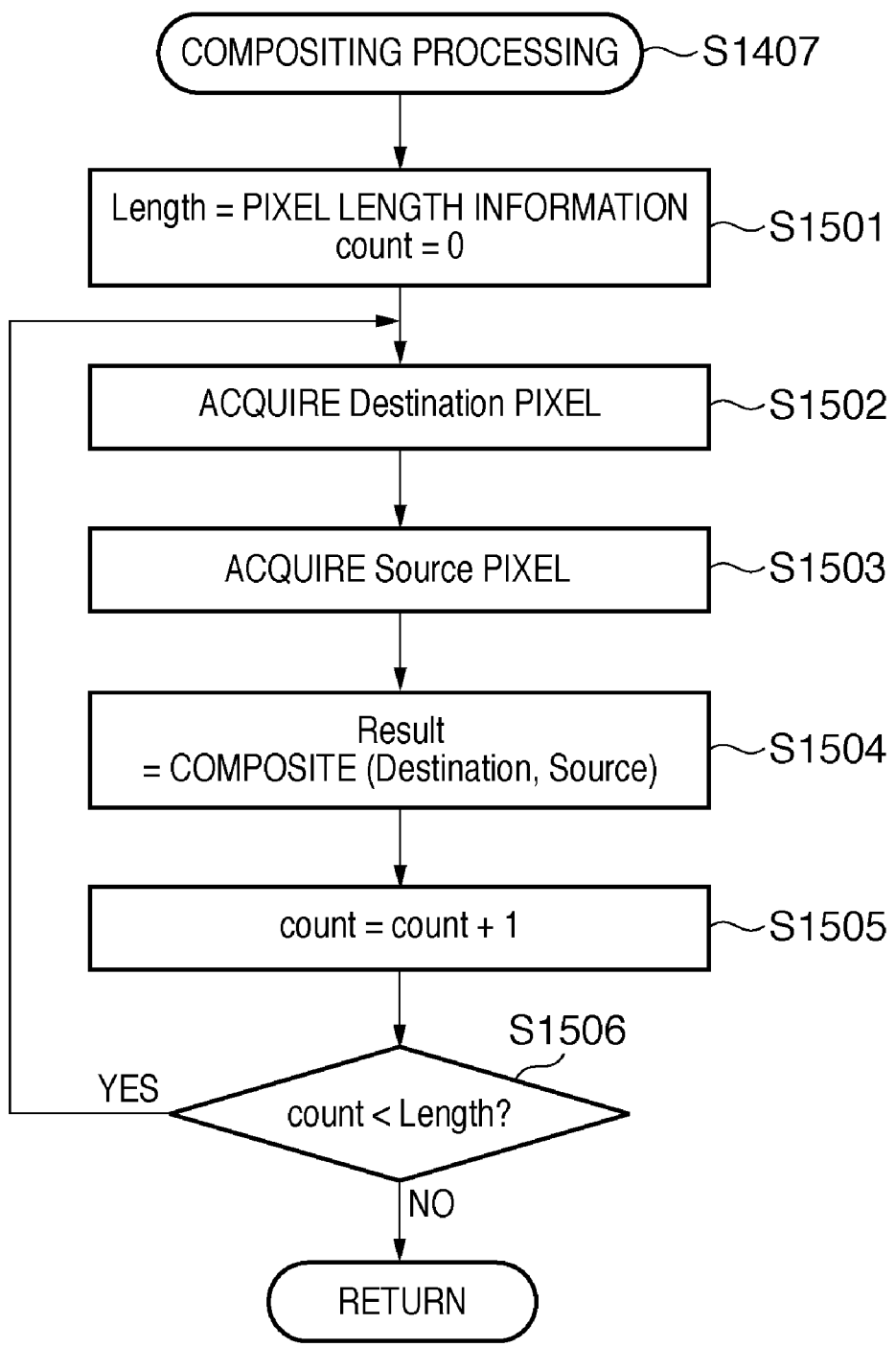
FIG. 15 is a flowchart showing an example of the processing sequence of a compositing processing S1407 in FIG. 14.

FIG. 15 is a flowchart showing details of the compositing processing (S1407) shown in FIG. 14.

In step S1501, the CPU 4011 executes an initialization process of respective parameters required for the compositing processing. For example, the CPU 4011 initializes information (a variable "count" in this case) indicating the number of processed pixels to zero. Furthermore, the CPU 4011 executes an acquisition process of the pixel length information 505 described using FIG. 6.

In step S1502, the CPU 4011 acquires a Destination pixel from the area 4033 on the RAM 4012. For example, this Destination pixel includes a white solid pixel that completely represents the background color in case of an initial process or a pixel as a result of the previous compositing processing.

In step S1503, the CPU 4011 acquires a Source pixel. The Source pixel is output by the first processor 400 to the communication memory 423 or the shared memory 424 in the layer pixel generation process S804 described in FIG. 10. Therefore, the CPU 4011 acquires the Source pixel from the communication memory 423 when the value of the pixel length information 505 is not larger than a threshold value, or from the shared memory 424 when that value is larger than the threshold value.

In step S1504, the CPU 4011 instructs the compositing processing unit 415 to execute a compositing processing of the Destination and Source pixels acquired in steps S1502 and S1503. In this step, assume that the compositing processing unit 415 executes the compositing processing corresponding to compositing type information. The composited result is stored in "Result".

In step S1505, the CPU 4011 executes a process for incrementing the number of generated pixels by count+1. With this process, the CPU 4011 manages the number of generated pixels. In step S1506, the CPU 4011 compares the number of processed pixels (count) with the pixel length information (Length) to determine if the processing is completed. If the number of pixels (count) is less than the pixel length information (Length) and the processing is not complete yet, the process returns to step S1502; if the number of pixels (count) is not less than the pixel length information (Length), and the processing is complete, the CPU 4011 ends this processing.

(Parallel Compositing Processing S1406)

Figure 16:
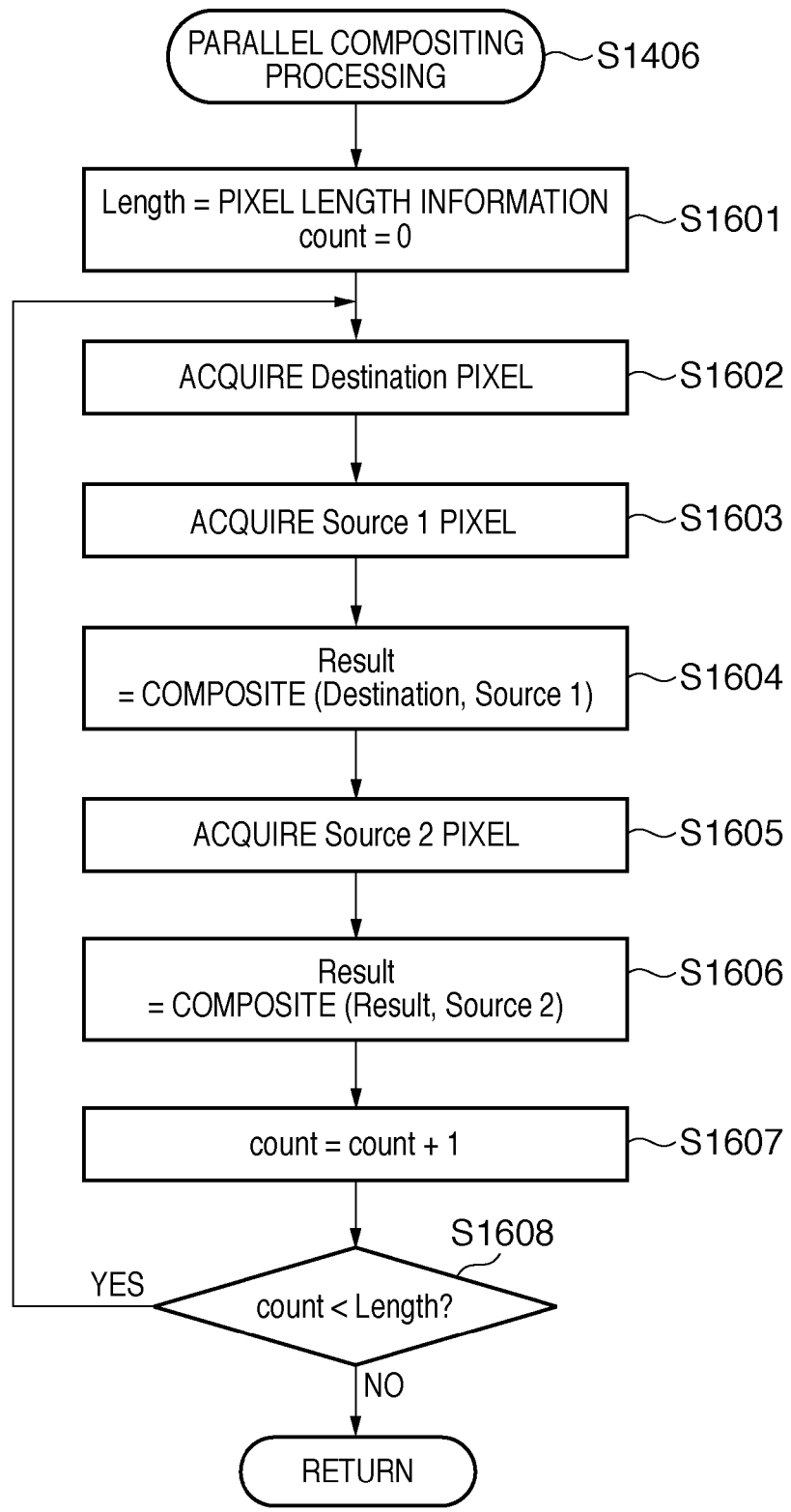
FIG. 16 is a flowchart showing an example of the processing sequence of a parallel compositing processing S1406 in FIG. 14.

FIG. 16 is a flowchart showing details of the parallel compositing processing (S1406) shown in FIG. 14.

In step S1601, the CPU 4011 executes an initialization process of respective parameters required for the parallel compositing processing. For example, the CPU 4011 initializes information (a variable "count" in this case) indicating the number of processed pixels to zero. Furthermore, the CPU 4011 executes an acquisition process of the pixel length information 505 described using FIG. 6.

In step S1602, the CPU 4011 acquires a Destination pixel from the area 4036 on the RAM 4012. For example, this Destination pixel includes a white solid pixel that completely represents the background color in case of an initial process or a pixel as a result of the previous compositing processing.

In step S1603, the CPU 4011 acquires a Source 1 pixel. The Source 1 pixel is output by the first processor 400 to the communication memory 423 or the shared memory 424 in the parallel layer pixel generation process S802 described in FIG. 11. In this case, the CPU 4011 acquires the Source 1 pixel from the communication memory 423 when the value of the pixel length information 505 is not larger than a threshold value, or from the shared memory 424 when that value is larger than the threshold value. For example, pixel "1" or "2" of layer 1 in communication state 2 in FIG. 12 is acquired.

In step S1604, the CPU 4011 instructs the compositing processing unit 415 to execute a compositing processing of the Destination and Source 1 pixels acquired in steps S1602 and S1603. In this step, assume that the compositing processing unit 415 executes the compositing processing corresponding to compositing type information. The composited result is stored in "Result".

In step S1605, the CPU 4011 executes an acquisition process of a Source 2 pixel. The Source 2 pixel is output by the first processor 400 to the communication memory 423 or the shared memory 424 in the parallel layer pixel generation process S802 described in FIG. 11. In this case, the CPU 4011 acquires the Source 2 pixel from the communication memory 423 when the value of the pixel length information 505 is not larger than a threshold value, or from the shared memory 424 when that value is larger than the threshold value. For example, pixel "6" or "7" of layer 2 in communication state 2 in FIG. 12 is acquired.

In step S1606, the CPU 4011 instructs the compositing processing unit 415 to execute a compositing processing of the Result and Source 2 pixels acquired in steps S1604 and S1605. In this step, assume that the compositing processing unit 415 executes the compositing processing corresponding to compositing type information.

In step S1607, the CPU 4011 executes a process for incrementing the number of generated pixels by count+1. With this process, the CPU 4011 manages the number of generated pixels. In step S1608, the CPU 4011 compares the number of processed pixels (count) with the pixel length information (Length) to determine if the processing is completed. If the number of pixels (count) is less than the pixel length information (Length) and the processing is not complete yet, the process returns to step S1602; if the number of pixels (count) is not less than the pixel length information (Length), and the processing is complete, the CPU 4011 ends this processing.

Other Embodiments

As has been pointed out in the first paragraph of this embodiment, the technical scope of the present invention is not limited to the printer control system, and is applicable to speeding up of parallel processes using a plurality of processors in other systems. For example, software applied to the present invention is not limited to the printer control system, but it is widely applicable to word-processor software, spreadsheet software, drawing software, and the like. They are also included in the present invention.

The object of the present invention may also be achieved when a storage medium which records a program code of software that implements the functions of the embodiments is supplied to a system or apparatus. In this case, the object of the present invention is also achieved when a computer (or a CPU or MPU) of the system or apparatus reads out and executes the program code stored in the storage medium.

In this case, the program code itself read out from the storage medium implements the functions of the aforementioned embodiments, and that program code and the storage medium which stores the program code constitute the present invention.

As the storage medium used to supply the program code, for example, a Floppy® disk, hard disk, magneto-optical disk, CD-ROM, CD-R, and CD-RW can be used. Also, a DVD-ROM, DVD-RAM, DVD-RW, DVD+RW, magnetic tape, nonvolatile memory card, and ROM can be used. Alternatively, the program code may be downloaded via a network.

The functions of the aforementioned embodiments can be implemented when the computer executes the readout program code. However, in addition, the present invention includes a case in which an OS (Operating System) or the like, which runs on the computer, executes some or all actual processes based on an instruction of that program code, thereby implementing the functions of the aforementioned embodiments.

Furthermore, the program code read out from the storage medium is written in a memory equipped on a function expansion board or unit, which is inserted in or connected to the computer. After that, a CPU or the like equipped on the function expansion board or unit executes some or all actual processes based on an instruction of the program code, thereby implementing the functions of the aforementioned embodiments.

In this case, the program is supplied directly from the storage medium that stores the program, or by downloading it from another computer, database, or the like connected to the Internet, a commercial network, or a local area network.

In the above embodiment, the electrophotography system has been exemplified as the printing system of the image forming apparatus. However, the present invention is not limited to the electrophotography system, and it is applicable to various other printing systems such as an ink-jet system, thermal transfer system, electrostatic system, and discharge breakdown system.

The form of the program may include that of an object code, a program code executed by an interpreter, or script data supplied to an OS (Operating System).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-128793, filed May 15, 2008, which is hereby incorporated by reference herein in its entirety.

What is claimed is:

1. An image processing apparatus for sharing image processing for an image area by a plurality of processors, comprising:
    an analysis unit adapted to analyze a tendency of compositing input pixel information in the image area;
    a determination unit adapted to determine a share of tasks to be processed by each of the plurality of processors based on an analysis result of said analysis unit; and
    a control unit adapted to control the share of tasks by each of the plurality of processors in accordance with the share of tasks determined by said determination unit.

2. The apparatus according to claim 1, wherein the plurality of processors comprise a first processor adapted to generate a plural-layer of pixel information to be composited in the image area, and a second processor adapted to composite the plural-layer of pixel information generated by said first processor.

3. The apparatus according to claim 2, wherein said analysis unit analyzes whether or not to require a compositing processing, and
    said determination unit determines to assign the generation of pixel information which is assigned to said first processor, to said second processor, when the compositing processing is not required.

4. The apparatus according to claim 2, wherein said analysis unit analyzes a complexity of a compositing processing, and
    said determination unit determines to assign the generation of pixel information which is assigned to said first processor, to said second processor, when the compositing processing is not complex.

5. The apparatus according to claim 2, wherein said analysis unit analyzes a size of area in which the compositing processing is performed, and
    said determination unit switches a communication method from said first processor to said second processor in said control unit in accordance with the size of area.

6. The apparatus according to claim 5, wherein when the size of area is not larger than a first threshold value, said determination unit determines to generate pixel information in a layer unit and to transmit the generated pixel information from said first processor to said second processor, and when the size of area is larger than the first threshold value, said determination unit determines to generate a plural-layer of pixel information in a pixel unit and to transmit the generated pixel information from said first processor to said second processor.

7. The apparatus according to claim 5, wherein when the size of area is not larger than a second threshold value, said determination unit determines to output the generated pixel information to a communication memory which connects between said first processor and said second processor, so as to transmit the generated pixel information from said first processor to said second processor, and when the size of area is larger than the second threshold value, said determination unit determines to output the generated pixel information to a shared memory, so as to transmit the generated pixel information from said first processor to said second processor.

8. The apparatus according to claim 1, wherein the image area is obtained by segmenting an image area in a line unit of a main scanning direction.

9. The apparatus according to claim 1, wherein the image area is obtained by segmenting an image area in a unit of area between edges of objects.

10. A method of controlling an image processing apparatus for sharing an image processing for an image area by a plurality of processors, comprising the steps of:
    analyzing a tendency of compositing input pixel information in the image area;
    determining a share of tasks to be processed by each of the plurality of processors based on an analysis result in the analysis step; and
    controlling the share of tasks by each of the plurality of processors in accordance with the share of tasks determined in the determination step.

11. The method according to claim 10, wherein the plurality of processors comprise a first processor adapted to generate a plural-layer of pixel information to be composited in the image area, and a second processor adapted to composite the plural-layer of pixel information generated by said first processor.

12. The method according to claim 11, wherein in the analysis step, whether or not to require a compositing processing is analyzed, and it is determined in the determination step to assign the generation of pixel information which is assigned to said first processor, to said second processor, when the compositing processing is not required.

13. The method according to claim 11, wherein in the analysis step, a complexity of a compositing processing is analyzed, and it is determined in the determination step to assign the generation of pixel information which is assigned to said first processor, to said second processor, when the compositing processing is not complex.

14. The method according to claim 11, wherein in the analysis step, a size of area in which the compositing processing is performed is analyzed, and in the determination step, a communication method from said first processor to said second processor in the control step is switched in accordance with the size of area.

15. A non-transitory computer-readable storage medium storing a program for making a computer execute respective steps of a method of controlling an image processing apparatus according to claim 10.

16. An image processing method for sharing image processing for an image area by a plurality of processors, comprising the steps of:

analyzing a tendency of compositing input pixel information in the image area; and controlling a share of tasks by each of the plurality of processors based on an analysis result in the analysis step.

17. An image processing apparatus for executing image processing using a first processor and a second processor, which are connected via an interface having a queue, comprising:

a control unit adapted to control to output an image from said first processor to said second processor in a pixel order when an image compositing processing is not required, and to alternately output images from said first processor to said second processor when the image compositing processing is required.

18. A printing apparatus, comprising:
a first processor;
a second processor;
a determination unit configured to determine whether or not to require a pixel compositing processing;

an execution unit (i) configured to execute, when the determination unit determines the pixel compositing processing is required, a pixel generation processing with the first processor and the pixel compositing processing with the second processor, and (ii) configured to execute, when the determination unit determines the pixel compositing processing is not required, the pixel generation processing with the second processor; and a print unit configured to print pixels that are executed the pixel generation processing or the pixel compositing processing.

19. The printing apparatus according to claim 18, wherein the execution unit is configured to execute, when the determination unit determines the pixel compositing processing is required, both a layer information generation processing and the pixel generation processing with the first processor and the pixel compositing processing for generated pixels with the second processor, and configured to execute, when the determination unit determines the pixel compositing processing is not required, the layer information generation processing with the first processor and the pixel generation processing with the second processor.

20. The printing apparatus according to claim 18, wherein the first processor comprises the determination unit and the execution unit.

21. A method of controlling a printing apparatus including a first processor, a second processor, and a print unit configured to print pixels, the method comprising the steps of: determining whether or not to require a pixel compositing processing; executing, when it is determined in the determination step that the pixel compositing processing is required, pixel generation processing with the first processor and to the pixel composition processing with the second processor, and executing, when it is determined in the determination step that the pixel compositing processing is not required, the pixel generation processing with the second processor.

22. The method according to claim 21, the executing step further comprising executing, when it is determined in the determination step that the pixel compositing processing is required, both a layer information generation processing with and the pixel generation processing with the first processor and the pixel compositing processing for generated pixels with the second processor, and executing, when it is determined in the determination step that the pixel compositing processing is not required, the layer information generation processing with the first processor and the pixel generation processing with the second processor.

23. The method according to claim 21, wherein the first processor executes the determination step and the execution step.

* * * * *